United States Patent [19]

Hara et al.

[11] Patent Number: 4,707,705

[45] Date of Patent: Nov. 17, 1987

[54] INK JET RECORDING DEVICE

[75] Inventors: Toshitami Hara, Tokyo; Yasushi Sato, Kawasaki; Yasushi Takatori, Machida; Yoshiaki Shirato, Yokohama, all of Japan

[73] Assignee: Canon Kabushiki Kaisha, Tokyo, Japan

[21] Appl. No.: 844,228

[22] Filed: Mar. 24, 1986

Related U.S. Application Data

[60] Continuation of Ser. No. 641,405, Aug. 14, 1984, abandoned, which is a continuation of Ser. No. 429,455, Sep. 30, 1982, abandoned, which is a division of Ser. No. 267,649, May 27, 1981, abandoned, which is a division of Ser. No. 87,801, Oct. 24, 1979, Pat. No. 4,296,421.

[30] Foreign Application Priority Data

| | | | |
|---|---|---|---|
| Oct. 26, 1978 | [JP] | Japan | 53-131860 |
| Oct. 26, 1978 | [JP] | Japan | 53-131861 |
| Oct. 30, 1978 | [JP] | Japan | 53-133376 |
| Nov. 14, 1978 | [JP] | Japan | 53-140111 |
| Nov. 14, 1978 | [JP] | Japan | 53-139978 |
| Nov. 14, 1978 | [JP] | Japan | 53-139979 |
| Dec. 4, 1978 | [JP] | Japan | 53-150377 |
| Dec. 15, 1978 | [JP] | Japan | 53-156102 |
| Dec. 20, 1978 | [JP] | Japan | 53-157148 |
| Dec. 27, 1978 | [JP] | Japan | 53-165883 |

[51] Int. Cl.[4] .......................... G01D 15/18; F16L 9/14

[52] U.S. Cl. .................................. 346/75; 346/140 R; 138/146

[58] Field of Search .............. 346/75, 140 IJ, 140 PD; 138/145, 146

[56] References Cited

U.S. PATENT DOCUMENTS

| | | | |
|---|---|---|---|
| 3,461,045 | 8/1969 | Franks | 346/75 UX |
| 3,655,530 | 4/1972 | Taylor | 346/75 X |
| 3,662,399 | 5/1972 | Yanou et al. | 346/140 IJ |
| 3,747,120 | 7/1973 | Stemme . | |
| 3,878,519 | 4/1975 | Eaton . | |
| 3,941,312 | 3/1976 | Ohno et al. | 346/75 X |
| 3,949,410 | 4/1976 | Bassous et al. | 346/75 |
| 3,958,255 | 5/1976 | Chiou et al. | 346/75 X |
| 4,079,384 | 3/1978 | Takano et al. | 346/140 IJ |
| 4,243,994 | 1/1981 | Kobayashi et al. . | |

*Primary Examiner*—George H. Miller, Jr.

*Attorney, Agent, or Firm*—Fitzpatrick, Cella, Harper & Scinto

[57] ABSTRACT

A device for recording comprising ejecting a liquid recording medium by heat energy which comprises a recording head composed of a discharging orifice for ejecting the liquid recording medium in a form of droplets, an inlet for introducing the liquid recording medium, a liquid chamber for holding the liquid recording medium, and a heating element for applying heat energy to the liquid recording medium in the liquid chamber, and a means for applying voltage pulse to control heating by the heating element, the distance between the surface of the heating element and the liquid recording medium being not more than 100 microns.

25 Claims, 52 Drawing Figures

INK JET RECORDING DEVICE

This application is a continuation of application Ser. No. 641,405, filed Aug. 14, 1984, now abandoned, which in turn is a continuation of Ser. No. 429,455, filed Sept. 30, 1982, now abandoned, which in turn is a division of Ser. No. 267,649, filed May 27, 1981, now abandoned, which in turn is a division of Ser. No. 087,801, filed Oct. 24, 1979, now U.S. Pat. No. 4,296,421.

BACKGROUND OF THE INVENTION

1. Field of the Invention

This invention relates to a recording device of the ink jet type in which liquid recording medium, generally called ink, is ejected and spattered in the form of droplets from a fine orifice and deposited onto a recording surface. More particularly, the invention is concerned with a recording device of the ink jet type based on ink ejecting principle utilizing heat energy which has not been seen as yet.

2. Description of the Prior Arts

So-called non-impact recording methods have recently drawn public attention because unconfortable noises hardly generate during the recording operation. Among these methods the so-called ink jet recording method is recognized to be particularly important which allows high speed recording on a plain paper without particular image-fixing treatment. Various types of the ink jet recording methods have been proposed, including those already commercialized and others still under development for practical use.

In the ink jet recording method, the recording is effected in such a manner that the liquid recording medium (called "ink" in connection with the explanation of this invention) is ejected and spattered in the form of droplets and further caused to adhere to a recording member such as paper and the like. Such particular recording method is generally classified into two types thereof. One of the two types is the so-called continuous type wherein fine droplets of ink are continuously ejected and spattered, and among them only ink droplets required to effect the recording are selectively introduced and deposited to a recording surface so that the recording is carried out. The other is the so-called ink on-demand type in which only when necessary for the recording, the ink is ejected toward a recording surface in the form of droplets and deposited thereto so that the recording is completed.

The ink on-demand type recording method is advantageous as compared with the continuous type one in that the apparatus for conducting the former can be made simple. That is, the former type does not need many attachments as required for the latter type, such as an ink charger and a deflection controlling mechanism for selecting and introducing the ink droplets necessary for the recording and a collector for ink droplets unnecessary for the recording. Therefore, the apparatus for conducting the former type can be simplified in structure and minimized in size.

In the ink on-demand type ink jet recording method, the ink jet head used therein is formed with a structure, in which the volume of a liquid chamber for storing the ink is varied periodically by mechanical vibration of a piezo vibrating element and the pressure action generated by the variation in the volume of the liquid chamber allows the ejection of the ink in the form of droplets from a discharge orifice. The concrete structure of the recording device is disclosed in, for example U.S. Pat. No. 3,747,120; IEEE Transactions on Industry Applications, vol. IA-13, No. 1, January/February, 1977 and the like. According to such ink on-demand type, the ink droplets are discharged and spattered, on demand, from a discharge orifice, and therefore since it is not necessary to control the course of the discharged ink droplets, the structure of the system can be made extremely simple as a whole.

However, the recording head used in the ink on-demand type recording method is considerably complicated in its inside structure because the ink droplets are formed on the basis of the mechanical vibration of the piezo vibrating element. Further, such recording head inadvantageously requires technique of high level in manufacturing and processing it, and it is considerably difficult to manufacture the recording head with the desired working accuracy. In addition to those drawbacks, the recording device of the ink on-demand type is accompanied by technical difficulty in attaining a multi-array of the recording head portions because the piezo vibrating element is technically difficult to delicately manufacture and mount and also because a small size of the piezo vibrating element having a desired frequency is extremely difficult to obtain, and hence such recording device is inadequate for high speed recording.

As explained in the foregoing, the conventional recording device of ink on-demand type involves fundamental problems to be resolved in respects of the structure, manufacturing the device, applicability to the high speed recording, multi-array of the recording head portions, construction of the system as a whole, and the like.

SUMMARY OF THE INVENTION

It is therefore the primary object of the present invention to provide an ink jet recording device with a novel construction which is free from various disadvantages seen from the conventional ink jet recording system and improved in the drawbacks involved in the conventional system.

It is another object of the present invention to provide an ink jet recording device of the type, wherein the ink is ejected and spattered in the form of droplets by heat action, which can attain especially the recording at economized energy, high speed recording and the recording at low cost, at the same time.

It is a further object of the present invention to provide an ink jet recording device which is excellent in conducting the recording at economized energy, at a high speed and by continuous operation.

It is still another object of the present invention to provide an ink jet recording device which is simplified in the structure and ensures stable discharge of the ink in the form of droplets by heat action for a long period of time.

According to one aspect of the present invention, there is provided a device for recording comprising ejecting a liquid recording medium by heat energy which comprises a recording head composed of a discharging orifice for ejecting the liquid recording medium in a form of droplets, an inlet for introducing the liquid recording medium, a liquid chamber for holding the liquid recording medium, and a heating element for applying heat energy to the liquid recording medium in the liquid chamber, and a means for applying voltage pulse to control heating by the heating element, the distance between the surface of the heating element and the liquid recording medium being not more than 100 microns.

According to another aspect of the present invention, there is provided a device for recording comprising ejecting a liquid recording medium by heat energy which comprises a recording head composed of a discharging orifice for ejecting the liquid recording medium in a form of droplets, an inlet for introducing the liquid recording medium, a liquid chamber for holding the liquid recording medium, and a heating element for applying heat energy to the liquid recording medium in the liquid chamber, and a means for applying voltage pulse to control heating by the heating element, the heating element being immersed in the liquid recording medium in the liquid chamber, and the distance between the surface of the heating element and the liquid recording medium not more than 100 microns.

According to a further aspect of the present invention, there is provided a device for recording comprising ejecting a liquid recording medium by heat energy which comprises a recording head composed of a discharging orifice for ejecting the liquid recording medium in a form of droplets, an inlet for introducing the liquid recording medium, a liquid chamber for holding the liquid recording medium, and a heating element for applying heat energy to the liquid recording medium in the liquid chamber, and a means for generating a mechanical pressure change in the liquid recording medium flowing into the liquid chamber, a means for synchronizing the application of heat energy to the liquid recording medium with the generation of the mechanical pressure change, and a means for applying voltage pulse to control heating by the heating element, the distance between the surface of the heating element and the liquid recording medium being not more than 100 microns.

According to still another aspect of the present invention, there is provided a device for recording comprising ejecting a liquid recording medium by heat energy which comprises a recording head composed of a discharging orifice for ejecting the liquid recording medium in a form of droplets, an inlet for introducing the liquid recording medium, a liquid chamber for holding the liquid recording medium, and a heating element for applying heat energy to the liquid recording medium in the liquid chamber, a means for generating mechanical pressure changes in the liquid recording medium flowing into the liquid chamber, a means for synchronizing the application of heat energy to the liquid recording medium with the generation of the mechanical pressure change, a means for applying voltage pulse to control heating by the heating element, the heating element being immersed in the liquid recording medium in the liquid chamber, and the distance between the surface of the heating element and the liquid recording medium being not more than 100 microns.

DETAILED DESCRIPTION OF THE PREFERRED EMBODIMENTS

The recording device of the present invention can be extremely minimized in the size of the essential portion as compared with the conventional recording device since it has the above-mentioned characteristics and hence its structure is remarkably simplified and also delicate manufacturing is possible with easiness. Further, in such recording device, the multi-array of orifices indispensable for the high speed recording is extremely easy to attain owing to the simplified structure and easiness in manufacturing. The array structure of the discharge orifices may be designed arbitrarily depending on desire, and therefore it is very easy to make the recording head portion into the form of a full-line bar. In addition to these advantages, even when the recording is carried out continuously for a long period of time, the ink droplets formed at that time are always substantially uniform and consistent in their size. Even when a heat generating member in the recording device is driven in a high range of frequency, ink droplets are formed at a sufficient high level of the corresponding frequency. That is, the frequency response during ink droplets-formation is very excellent, and therefore the high speed recording can be continuously effected in the stable condition for a long period of time, and further the recorded image is sufficiently faithful to the original information.

Furthermore, as additional effect arising from the above-mentioned characteristics of the present invention, the freedom degree of selecting the ink may be extremely broadened in comparison to the conventional recording device. Also, the ink may flow smoothly in the liquid chamber, and therefore the recording device is very responsive to the frequency of voltage pulse repeatedly given. Particularly, in the present invention, its effect is more exhibited in the recording device having the multi-array of orifices with high density.

Further, the distance between the heat generating member and the ink may be determined taking account of various conditions, for example heat response of ink droplet-formation and economy of energy, and it is generally 0-100 microns, preferably 10 angstroms—100 microns, more preferably 100 angstroms—20 microns. The optimum is 200 angstroms—10 microns.

Figure 1:
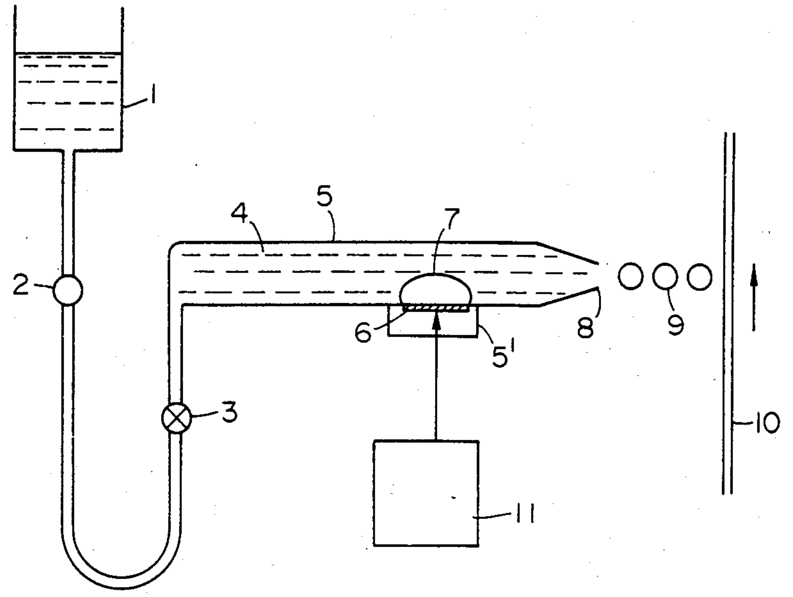
FIG. 1 is an explanatory illustration of an example according to the present invention.

Referring to the drawings, this invention will be explained in detail. FIG. 1 illustrates schematically an embodiment of a recording device which is one example according to the invention. Ink 4 is supplied from an ink-supplying means 1 to a liquid chamber 5 while the pressure is controlled by a pump 2 and the flow amount is regulated by a valve 3. Voltage pulse is supplied from a voltage pulse-supplying means 11 to a heat generating member 6 which is provided on a heat-discharging substrate 5' with a high heat conductivity constituting part of the liquid chamber 5 and which is in contact with or in the neighborhood of the ink, in accordance with information to be recorded. As a result, the heat generating member 6 is heated by applying the voltage pulse, and hence the ink 4 is varied in its state. The variation of the state takes place as expansion of the liquid or formation of bubbles in the form of a pulse corresponding to the supplied voltage pulse. In FIG. 1, numeral 7 denotes a bubble. The change in the state of the ink 4 allows discharge and ejection of the ink in the form of droplets 9 from an orifice 8 so that the ink droplets 9 are deposited onto a paper 10, thereby providing an image of the ink corresponding to the information to be recorded.

In that case, since the surface of the heat generating member 6 is brought substantially into line with the inner wall surface of the liquid chamber including at least a portion in which the heat energy generated by the member 6 acts on the ink, or since such surface of the member 6 is spaced from the ink 4 by a distance of 100 $\mu$m or below, many advantages can be obtained. For example, even when the continuous recording is conducted for a long period of time, the size of the ink droplets 9 is substantially uniform at all times. Also, when the heat generating member 6 is operated in the range of high driving frequency, the ink droplets can be formed in a high frequency correspondingly to the driving frequency of the heat generating member 6, and hence the high speed recording can be conducted continuously for a long period of time under the stable conditions and further the obtained record is faithful to the original information.

Moreover, additional effects can be obtained from the featured construction of the recording device as mentioned above. Typically, selection of the ink can be freely done in the broad extent in comparison to the conventional recording device. Further, since the flow of the ink becomes smooth in the liquid chamber, the discharge of ink droplets can be effected sufficiently in conformity with the frequency of the repeatedly given voltage pulse. Particularly, the effects of this invention are more exhibited in the multi-array of orifices with high density.

Figure 2:
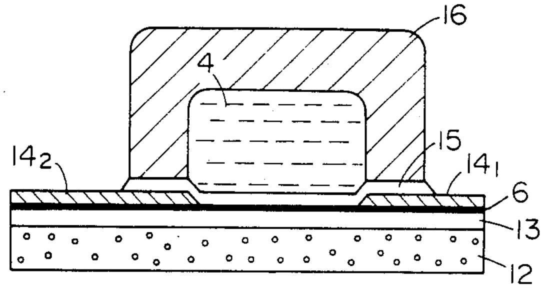
FIG. 2 is a cross-sectional view of the arrangement portion of the heat generating member shown in FIG. 1 which is taken perpendicularly to the paper surface of the drawing.

FIG. 2 illustrates a sectional view of the arrangement portion of the heat generating member which is taken in the direction perpendicular to the paper surface of FIG. 1. The fabrication procedure of the recording device shown in FIG. 2 will be explained below. First of all, a heat resistant film 13 with a low heat conductivity is coated in a thickness of about 0.3-50 $\mu$m, more preferably about 1-10 $\mu$m onto a substrate 12 with a high heat conductivity. A heat generating member 6, and electrodes $\mathbf{14}_1$, $\mathbf{14}_2$ for conduction of electricity are fabricated in place. If necessary, a protecting film 15 is formed on the heat generating member 6 and electrodes $\mathbf{14}_1$, $\mathbf{14}_2$. This protecting film 15 is not always necessary, but it is advantageous in that insulation between the ink 4, and heat generating member 6 and electrodes 14 is established and that the heat resistance of the heat generating member 6 is improved. The material for the substrate 12 of a high heat conductivity includes, for example metals such as Al and Cu, and ceramics such as $Al_2O_3$.

The heat-resistant film 13 is generally composed of a material having a poor heat conductivity, and such a material is coated as a thin layer onto a substrate having a good heat conductivity so that an ideal change in temperature close to a rectangular wave is obtained in the heat generating member. The thickness of the heat-resistant film 13 is varied depending on the width and cycle of the pulse applied to the heat generating member 6, but it usually about 1 μm–10 μm. The material for the heat-resistant film 13 includes, for example oxides such as $SiO_2$, and heat-resistant organic material such as polyimide.

The heat generating member 6 may be both a heater of thick film type such as, for example that of Pd-Ag; a heater of thin film type such as, for example that of metal boride, e.g., $ZrB_2$, or others, e.g., $Ta_2N$, W, Ni-Cr. The thin film type heater is more preferable in respect of the heat response. The electrodes $\mathbf{14}_1$ and $\mathbf{14}_2$ are usually made of Al, Au or the like. The protective film 15 is required to establish the insulation between the film and ink 4 particularly when the ink 4 is electrically conductive, and besides the film 15 is preferable for improving the heat-resistance of the heat generating member 6.

The protective film 15 is preferably made sufficiently thin and high in its heat-conductivity for the purpose of transmitting the heat in the heat generating member 6 to the recording medium. For example, as for an $SiO_2$ film formed by the sputtering method, its thickness is preferably about 0.5–2 μm.

From the point of view of heat conductivity, it is more preferable that the distance between the ink and heat generating member approaches 0 μm. However, the ink is, by necessity, spaced from the heat generating member through the protective film in some cases, for example for improving mechanical strength, for convenience of the fabricating step, for easiness of realizing the multi-array of orifices in addition to the cases of establishing the foregoing insulation and improving the heat resistance of the heat generating member as mentioned above. Even in those cases, the distance between the ink and heat generating member is preferably 10 μm or below with the upper limit of 100 μm. and the ink and heat generating member are preferably composed of material having as high heat conductivity as possible. Further, at the side of the heat generating member opposite to the side at which such member faces the ink, two layers, that is, a thin film of 1–10 μm thick having a poor heat conductivity and a heat discharging member having a good heat conductivity are preferably provided for the purpose of improving the frequency characteristic.

Figure 3:
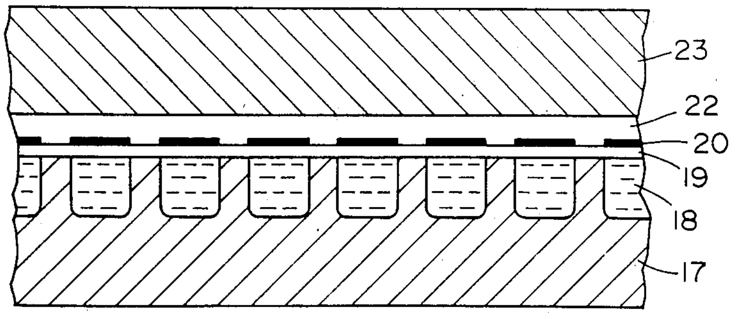
FIG. 3 is a cross-sectional view of a construction of multi-heads.
Figure 4:
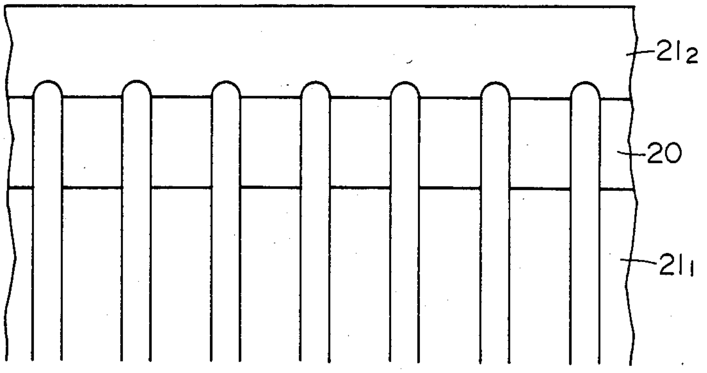
FIG. 4 is a schematic view seen from the glass substrate in FIG. 3.

FIG. 3 illustrates a cross sectional view of a recording head having the multi-array of orifices according to this invention. That is, grooves 18 of 100 μm in width and 100 μm in depth are formed in a glass substrate 17 at an interval of 125 μm and filled up with polyvinyl alcohol (P.V.A.). An $SiO_2$ layer 19 of 2 μm in thickness is overlaid thereon by the cold sputtering method, and further a $ZrI_2$ layer 20 of 1000 angstroms as the resistor and an Al layer 21 of 1 μm in thickness as the electrode are formed in the named order. Thereafter, the selective photo-etching is conducted to form a pattern as shown in FIG. 4, which illustrates schematically the recording head shown in FIG. 3 viewed from the side of its glass substrate. An $SiO_2$ layer 22 of 4 μm in thickness is then formed by the sputtering method, and further plating of Cu is effected to form a heat discharging plate 23. Subsequently, the polyvinyl alcohol (P.V.A.) in the grooves 18 is removed by dissolving out so that liquid chambers for ink are formed therein. In the above example, the heat generating member is 100 μm×150 μm in the area and about 60 ohm in the resistance. Further, ink droplets are discharged at a frequency of 15 kHz by application of square pulse of 20 μsec.

Figure 5:
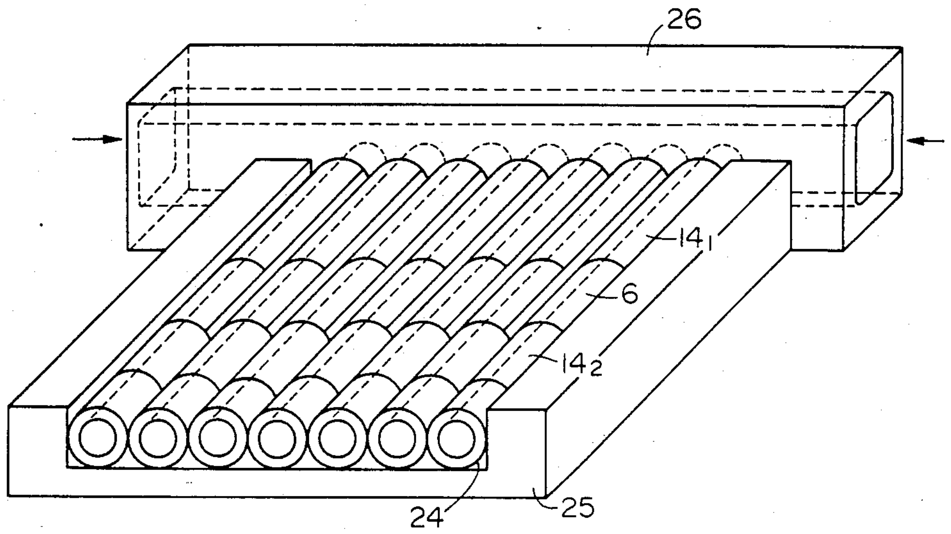
FIG. 5 is a schematic view of multi-heads using cylindrical nozzles.

FIG. 5 illustrates a perspective view of a recording head of a multi-arrayed orifices type, in which cylindrical members 24 for forming liquid chambers are arranged.

Figure 6:
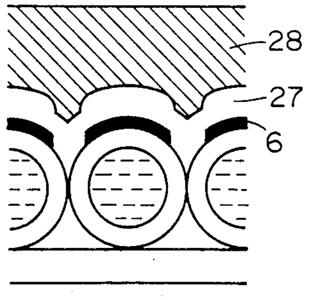
FIG. 6 is a cross-sectional view of FIG. 5.

FIG. 6 illustrates a partial cross sectional view of the recording head shown in FIG. 5, in which its heat generating member portion is broken away in the direction perpendicular to that of discharging ink droplets. A pipe having an outside diameter of 100 μm and an inside diameter of 85 μm is used as the cylindrical member 24. A plurality of the pipes are fixed on a holder 25. Thereafter, a heat generating member 6 and electrodes $\mathbf{14}_1$, $\mathbf{14}_2$ are formed around the pipe as shown in the drawing. The photo-etching procedure is effected to form a desired pattern. Subsequently, an $SiO_2$ layer 27 of 6 μm in thickness is formed on the heat generating member 6 to complete the portion of the heat generating member. Then, an ink supplying tube 26 is combined with the arrangement of the cylindrical members 24 as shown in FIG. 5.

When a square pulse of 10 μsec. is applied to the head shown in FIG. 5, ink droplets are discharged in a stable state until the frequency approaches 500 Hz. In order to improve heat release in the heat generating member portion, a Cu plating of 1 mm in thickness is provided as a heat sink 28. At that time, the frequency response is also improved. For example, even at a frequency of 4.5 kHz, the ink droplets is discharged stably with improved results. In addition, the heat generating member may be provided over the inside surface of the liquid chamber as shown in FIG. 7, which will be explained below.

Figure 7:
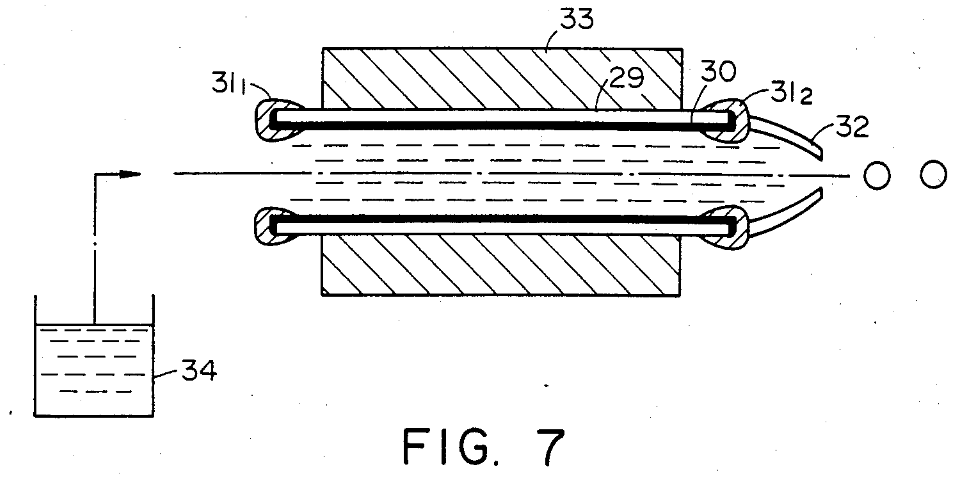
FIG. 7 is a cross-sectional view of another embodiment of this invention, in which a heater is provided on the whole of the inside surface of a cylindrical nozzle.

With reference to FIG. 7 illustrating schematically another head, a thin film of resistor 30 is formed as the heat generating member on the inside surface of a pipe 29 having an outside diameter of 100 μm and an inside diameter of 60 μm in accordance with the dipping method, chemical vapor deposition and other methods. Electrodes $\mathbf{31}_1$ and $\mathbf{31}_2$ are formed on both ends of the pipe, for example by the sputtering method. An orifice 32 is then mounted to one of the ends of the fiber pipe. For the purpose of improving heat discharge, the fiber pipe is embeded in a heat sink 33.

To the above head is fed ink from an ink supplying means 34, and square pulse of 5 μsec. is applied to the heat generating member. At that time, ink droplets are discharged and ejected in a stable manner at a frequency of 30 kHz.

In the foregoing examples, the ink is prepared by mixing and dissolving the following composition and then filtering it.

| Composition: | |
|---|---|
| Water | 68 gr |
| Ethylene glycol | 30 gr |
| Direct Fast Black B (Sumitomo Chemical Co., Ltd.) | 2 gr |

Figure 8:
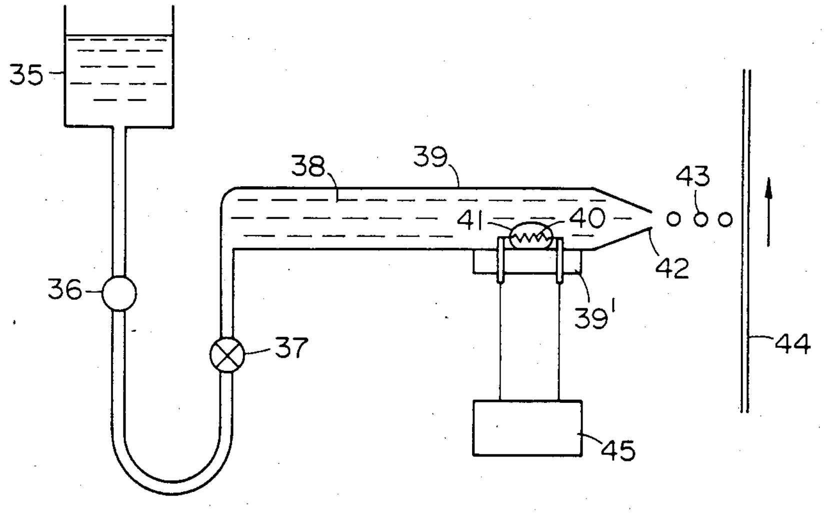
FIG. 8 is an explanatory view of a further embodiment of this invention.

FIG. 8 illustrates schematically another embodiment of the recording device according to this invention. In this embodiment, ink 38 is fed from an ink supplier 35 into a liquid chamber 39 including at least the area in which heat energy generated in a heat generating member 40 acts on the ink, while the pressure of the ink is controlled by a pump 36 and the flow amount of the ink is also regulated by a valve 37. Voltage pulse is supplied in accordance with information to be recorded, from a voltage pulse-supplying means 45 to a heat generating member 40 which is adjacent to a substrate 39′ attached to a portion of the liquid chamber 39 and arranged so that it is immersed into the ink 38. As a result, the heat generating member 40 is heated so that the ink 38 varies in its state. The variation of the state takes place as expansion of the ink or formation of bubbles in the form of a pulse corresponding to the supplied voltage pulse. In FIG. 8, numeral 41 denotes a bubble. The change in the state of the ink gives rise to pressure action which allows discharge and ejection of the ink in the form of droplets 43 from an orifice 42 so that the ink droplets 43 are deposited onto a paper 44, thereby providing an image of the ink corresponding to the information.

In that case, since the heat generating member 40 is immersed and arranged in the ink, the efficiency of heat conduction from the member 40 to the ink 38 is high, and the heat response of the ink is very excellent during discharge of ink droplets 43. Therefore, the efficiency of forming the ink droplet 43 is also very good, and the high speed recording becomes possible at a low energy.

Figure 9:
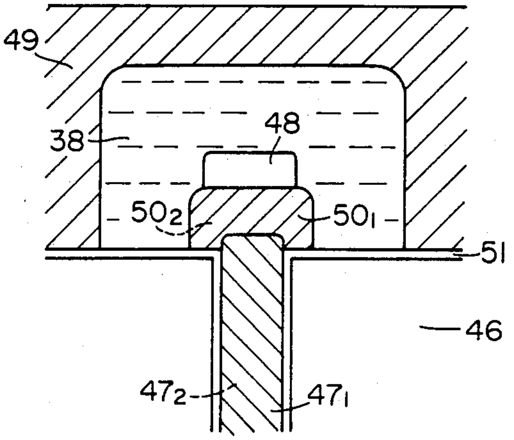
FIGS. 9 and 10 are enlarged cross-sectional views taken perpendicularly to and in parallel with the paper surface of FIG. 8, at the arrangement portion of the heat generating member.
Figure 10:
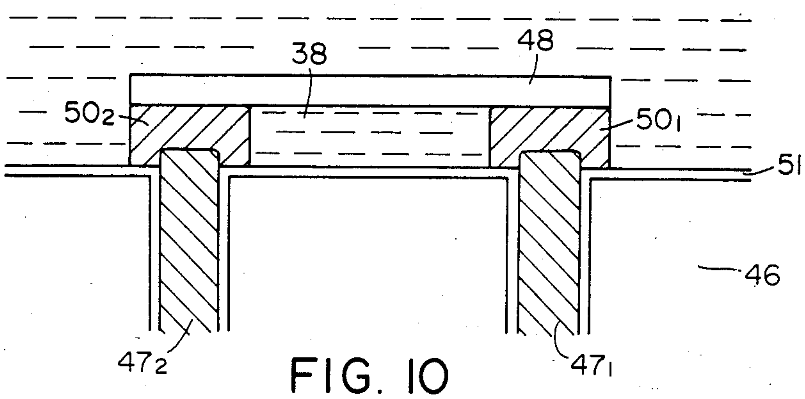

FIG. 9 illustrates schematically an enlarged cross-sectional view of the area including the heat generating member shown in FIG. 8 which is broken out perpendicularly to the paper of the drawing. FIG. 10 illustrates schematically a partially cross-sectional view of the area including the heat generating member shown in FIG. 9 as the main part which is broken out perpendicularly to the paper of the drawing. The device illustrated in those drawings is prepared in the following manner.

Electrode rods $47_1$ and $47_2$ are inserted and fixed to a substrate 46 having a high heat conductivity with its the surface having been subjected to the insulation treatment. Successively, a heat generating member 48 is joined onto electrodes $50_1$, $50_2$ of the electrode rods $47_1$, $47_2$ so that it may be spaced from the substrate 46 by usually about 0.1 μm–20 μm, preferably 1 μm–10 μm. If desired, the heat generating member 48 may be provided with an optional protective film for the purpose of attaining the insulation between the member 48 and ink 38 and improving the heat resistance of the member 48.

A plate 49 having a groove to form a liquid chamber for introducing ink is fixed so as to encircle the heat generating member 48. The plate 49 may be the same as, or different from the substrate 46 in terms of the constituting material. Further, it is possible to form the plate 49 and substrate 46 integrally from one, the same material, for example a material like tube. The heat generating member 48 may take various forms, for example a thin film such as that formed by the vapor-deposition and sputtering methods; a thick film such as that formed by the printing method; and wire. In addition, such member 48 should be preferably made with a structure leading to a small heat capacity in order to enhance the heat response.

The heat generating member may be prepared from various materials. For example, as for such member of a thin film, metal boride such as $ZrB_2$, and others such as $Ta_2N$, NiCr and $SnO_2$ may be used; as for the thick film type, Pd-Ag, Ru and the like are preferable; and as for the wire type, it should be a thin wire such as Pt, Ni-Cr, W and the like wires.

In order to obtain the substrate of a high heat conductivity, it is preferable to use an electrically conductive materail such as Al, Si or the like which have received the oxidation treatment at the surface, in addition to ceramics such as $Al_2O_3$. The electrodes $50_1$ and $50_2$ may be usually made of Al, Au and the like.

Still another embodiment of the present invention will be explained with reference to the above drawings.

A wafer of Si having a thickness of 0.5 mm is provided with a hole for receiving an electrode rod of 200 μm in diameter, and an $SiO_2$ film 51 is formed on the surface by the heat treatment. A wire of Au having a diameter of 160 μm is inserted into the hole as the electrode rod and fixed. The side of the surface to be brought into contact with ink is provided with an Au coating of 5 μm in thickness by the plating procedure, and the photo-etching is then conducted so that the Au coating remains as an electrode of 300 μm×300 μm only on the portion of the electrode rod. Thereafter, while the photoresist resin is left on the Au electrode, Al is vapor-deposited in a thickness of 5 μm. The photoresist resin is then removed from the Au electrode. Subsequently, $ZrB_2$ layer of 5 μm in thickness is formed as the heat generating member by the sputtering method. The $ZrB_2$ film is formed into a shape of 20 μm in width and 500 μm in length by the photo-etching treatment, and thereafter only the Al film is selectively etched to form a heat generating member 48 as shown in FIGS. 9 and 10.

The plate 49 is formed with a groove of 300 μm in width and 150 μm in depth and thereafter bound to the above substrate. An orifice plate having a discharge orifice of 50 μm in the inside diameter is firmly adhered to one end of the plate 49, while an ink supplying pipe having an inlet of 80 μm in the inside diameter is brought into close contact with the other end of the plate 49.

The thus formed heat generating member 48 is 20 ohm in resistance. A square wave of 10 V in pulse width of 10 μsec. is applied to the heat generating member. At that time, the ink is discharged and ejected in the form of droplets in a stable state in accordance with the information until the frequency approaches 7 kHz so that a good image is obtained. In that case, the used ink is of the following composition, which is mixed, dissolved and filtered.

| Composition: | |
|---|---|
| Water | 68 gr |
| Ethylene glycol | 30 gr |
| Direct Fast Black B<br>(Sumitomo Chemical Co., Ltd.) | 2 gr |

A still further example of the recording device according to the present invention will be described below. In this example, its object is to further improve the response to frequency during discharge of ink droplets by the following manner. That is, the cross-sectional area of the heat energy acting zone in the liquid chamber is designed not so as to be exceedingly large as compared with that of the discharge orifice, and the heat energy acting zone is also designed so as to attain high flowing speed of ink and to remove undesirable bubbles formed from dissolved oxygen along with the flow of ink, out of the liquid chamber. Owing to the design, the volume occupied by such undesirable bubbles in the liquid chamber is regulated to a certain valve or below so that the frequency response during discharge of ink droplet is improved.

Figure 11:
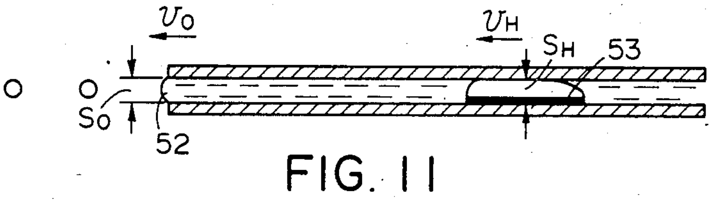
FIGS. 11 and 12 are schematic cross-sectional views taken in the direction of the axis of a recording head according to this invention.
Figure 12:
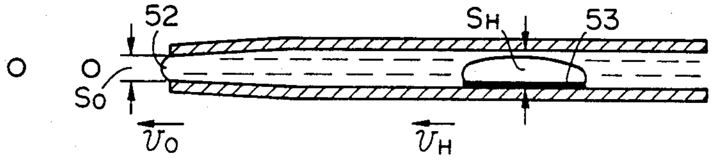

FIGS. 11 and 12 illustrate schematically cross-sectional views of the recording heads. Among the opening area ($S_o$) of the discharge orifice 52, an average flowing speed ($v_o$) of ink at the orifice portion 52, cross-sectional area ($S_H$) of the inside of the liquid chamber at the heat generating member-acting zone 53 and an average flowing speed ($v_H$) of ink at the zone 53, the following relation is established.

$$S_o \cdot v_o = S_H \cdot v_H$$

Further, when the volume of the discharged ink in the form of droplet is expressed by "V" and the frequency is by "f", then the following equations are established.

$$S_H \cdot v_H = V \cdot f$$

$$v_H = V \cdot f / S_H$$

The volume (V) of the ink droplet is substantially determined by the opening area ($S_o$) of the discharge orifice. When the value of $S_H$ is larger than that of $S_o$, the value of $v_H$ becomes smaller so that bubbles of dissolved oxygen etc. are liable to remain in the liquid chamber.

For example, when the diameter of the ink droplet is 100 μm and the frequency is 10 kHz, in case of $S_H$=1 mm×1 mm, the value of $v_H$ is 5.2 mm/sec., while in case of $S_H$=100 μm×100 μm, the value of $v_H$ becomes as large as 52 cm/sec. so that the bubbles are liable to be pushed and removed out of the liquid chamber.

Figure 13:
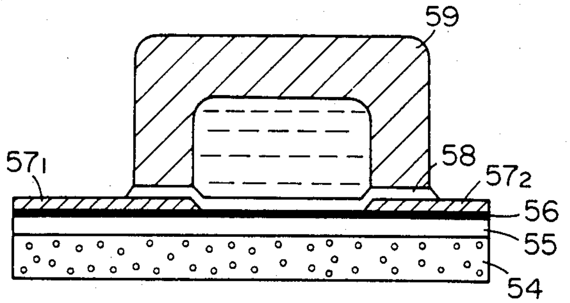
FIG. 13 is a transverse sectional view of the portion including the heat generating member illustrated in FIGS. 11 and 12.

FIG. 13 illustrates a transverse sectional view of the portion including the heat generating member-acting zone 53 of the recording head shown in FIGS. 11 and 12. First of all, an $SiO_2$ layer 55 of 3 μm in thickness is formed on an Al substrate 54 of 5 mm in thickness by the sputtering method. An $HfB_2$ layer of 1000 angstroms in thickness as a heat generating member 56 and an Al layer of 5000 angstroms for constituting electrodes 57$_1$ and 57$_2$ are laminated in the named order, and the photo-etching procedure is carried out to expose the heat generating member in an area of 100 μm in width and 1 mm in length along the groove. Subsequently, an $SiO_2$ layer 58 of 5000 angstroms is formed thereon by the sputtering method to complete the heat generating member. A grooved plate 59 having a groove for providing the inside cross-sectional area of 0.01 mm$^2$, of the liquid chamber at the heat generating member-acting zone is adhered to the substrate so as to encircle the heat generating member portion with the groove. Then, an orifice plate having an orifice of 80 μm in diameter is adhered to the front end of the groove, while an ink-introducing pipe is also joined to the rear end of the groove so that a recording head is obtained. Similarly, the above procedure is repeated with the exception that two grooved plates are used which have, respectively, grooves for defining the inside cross-sectional area of the liquid chamber at the heat generating member-acting zone to 0.05 mm$^2$ and 0.25 mm$^2$, and as a result, two kinds of recording heads are obtained.

The heat generating member is 200 ohm in the resistance. A square wave of 30 V in pulse width of 5 μsec. is applied to the heat generating member to test the frequency response at the time of ink ejection with respect to the three kinds of the recording heads. As a result, it is found that as the inside cross-sectional area of the liquid chamber at the heat generating member-acting zone is reduced to a smaller value, the recording head is capable of exhibiting good response even at high frequency. At the time of the same frequency, the recording head having a larger cross-sectional area of the liquid chamber allows discharge of the ink only for several seconds and thereafter stops the discharge because many bubbles stay in the liquid chamber. The frequency response limits for the three recording heads during discharge of ink droplets are shown in the following.

| Cross-sectional area* | Frequency response limit |
|---|---|
| 0.01 mm$^2$ | 15 kHz |
| 0.05 mm$^2$ | 8 kHz |
| 0.25 mm$^2$ | 2 kHz |

*Of the inside of the liquid chamber at the heat generating member-acting zone.

The ink used in the above example is prepared by mixing and dissolving the following components followed by filteration.

| Components: | |
|---|---|
| Toluene | 70 gr |
| Ethylene glycol | 28 gr |
| Oil Black HBB (supplied by Orient Chemical Industries Ltd.) | 2 gr |

Although the above-mentioned example relates to a single head, even when it is modified into a recording head having multi-array of orifices, more preferable results can be obtained in designing the inside cross-sectional area of the liquid chamber at the heat generating-acting zone not so as to be exceedingly large in comparison to the area of the orifice, similarly to the case of the single head. That is, the best frequency response is obtained when the value of $S_o/S_H$ is close to "1", and relatively good result is obtained when $S_o/S_H$ is in range of ¼–4. If $S_o/S_H$ is 1/10 or below, or 10 or above, ink droplets are discharged only in unstable state or hardly ejected.

In the following, a still another embodiment of the recording head, which is able to effect the recording at economized energy and prevent splash phenomenon of the ink will be explained with reference to the drawings.

Figure 14:
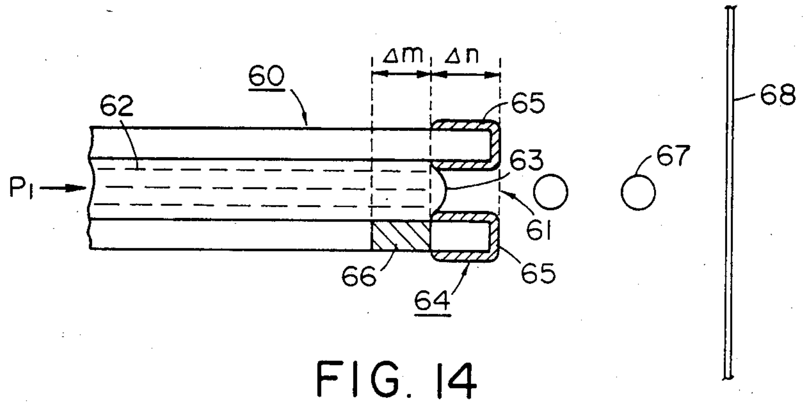
FIG. 14 is a longitudinal sectional view of the essential part of a recording head according to this invention.

FIG. 14 illustrates the essential portion of this embodiment. In a recording head portion 60, ink 62 receives pressure $P_1$ and forms a meniscus 63 at the position which is spaced from a discharge orifice 61 towards the inside of the head by a distance Δn. The area formed between the orifice 61 and the position spaced from the orifice by a distance Δa will be hereinafter called land portion 64, which is subjected to the water-repellent treatment when the ink 62 contains water as the main solvent, or receives the oil-repellent treatment when the ink contains various organic compounds as the main solvent. Numeral 65 denotes a treating material layer formed by the treatments. The pressure P may be applied either by an artificial means such as a pump and the like or by the gravity given to the ink itself. A heat generating member 66 is formed in the area denoted by Δm which is preferably close to the land area 64. Now, when an electric signal is applied to the heat generating member 66, the ink in the area Δm is subjected to sudden change in pressure, which destroys the meniscus 63 to eject the ink forward (in the right direction in the drawing). At that time, the ink is not "splashed", but is ejected in the form of separate droplets 67 owing to the presence of the land area 64 of a sufficient length. The ink droplets thus ejected are deposited to a recording material 68, thereby effecting the recording.

Figure 15:
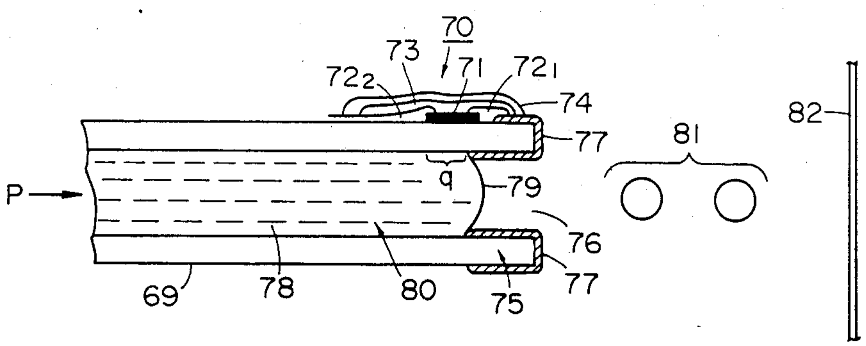
FIG. 15 is a longitudinal sectional view of the essential part of another recording head according to this invention.

FIG. 15 illustrates a modification of the embodiment shown in FIG. 14. A heat generating member portion 70 is formed on a partial or complete outside periphery of a cylindrical material 69 made of glass or ceramics. The portion 70 is composed of a heat generating resistor 71, electrodes $72_1$ and $72_2$, protective film 73 and oxidation-preventing layer 74. A land area 75 and discharge orifice 76 are covered with a treating material layer 77 formed by the water-repellent or oil-repellent treatment. The ink 78 is filled in the inside of the cylindrical material 69 by the pressure $P_2$ so that it is in contact with the layer 77 and forms a meniscus 79. If electric signal is applied to the electrodes $72_1$ and $72_2$, heat generation takes place in the heat generating resistor 71 so that bubbles are suddenly formed in the ink 78 in contact with the area "q" of a liquid chamber 80 in which the heat generating member 71 is formed. The resulting pressure action allows ejection of the ink 78 in the form of droplets 81. The ink droplets 81 are ejected forward (in the right direction in the drawing) and deposited onto a recording material 82 to complete the recording.

As explained in the foregoing, the liquid chamber portion including the discharge orifice, particularly the land area and orifice are subjected to the water-repellent or oil-repellent treatment, thereby making it possible to reduce the energy for ejecting ink droplets and attain the high speed recording operation. Further, the ink is discharged in the form of separate droplets without the "splash phenomenon" so that a good record free from fog can be obtained.

In addition, the water-repellent or oil-repellent treatment is done by immersing the already prepared recording head into a treating liquid, by spraying a dispersion liquid of Teflon onto the head or the like method. As for the immersing method, a toluene solution of silicone resin is used in case of the water-repellent treatment, while an aqueous solution of gum arabic-phosphoric acid is employed in case of the oil-repellent treatment.

By the way, technical problems to be resolved still remain in the foregoing embodiments of this invention.

(1) One of them is to improve the efficiency of energy for discharging ink droplets, that is, to reduce the energy necessary for the recording by increasing the discharge amount of ink droplets per input energy.

(2) The other problem is to make the discharged ink droplets uniform in droplet size for the purpose of stabilizing and improving the quality of the record.

As a result of the earnest study of the inventors, it is found that as the discharge orifice of the recording head becomes smaller in caliber, the efficiency of energy for discharging ink droplets is enhanced and that as the shape of the cross-section of the orifice becomes close to a circle, the ink droplets are made uniform in size. However, it is not easy from the point of view of manufacturing to satisfy these conditions required for the ink jet type recording head. For example, it is difficult without a highly sophisticated technique to form a nozzle portion with a fine opening and make its tip smaller. Further, the manufacturing yield is not so good. Similarly, when the recording head is formed into a multi-array type one, technical difficulty is present to a great extent.

On the contrary, when the discharge orifice is regulated with a resin-cured layer, the above mentioned problems (1) and (2) can be resolved. The concrete manner for that purpose will be explained with reference to the drawings. An example of preparing a recording head of multi-array type will be explained.

Figure 16:
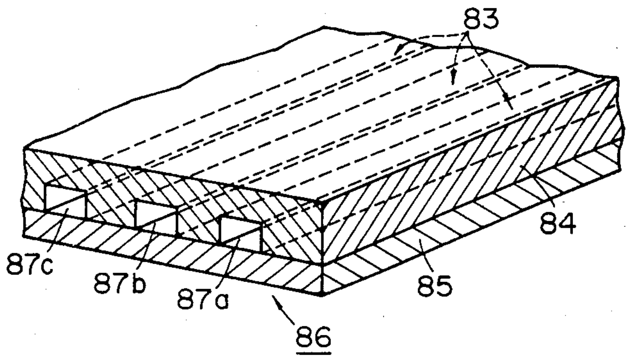
FIGS. 16 and 17 are schematic perspective views of a still further example of the present invention, particularly to show liquid chamber.

In the first step, a substrate 84 having a plurality of longitudinal grooves 83 is joined to a plain plate 85 to form a liquid chamber portion 86 constituting the main part of the recording head, as illustrated in FIG. 16. The substrate 84 may be composed of glass, quartz, ceramics, metals, plastics or the like. The material of the plate 85 may be the same as that of the substrate 84. In the drawings, **87*a*, 87*b* and 87*c*** denote openings.

Further, when this recording head is adapted to the foregoing ink jet type recording based on heat energy, the following step (not shown) is added to form a liquid chamber portion 86. That is, an $SiO_2$ layer is formed as a heat storing layer on the plate 85 by the vapor deposition method. Further, $Ta_2N$ is deposited thereto so as to form a heat generating resistor layer, and aluminum is then vapor deposited as an electrode. A desired pattern is formed in the aluminum electrode by the etching procedure to expose at least a portion of the heat generating resistor layer. The thus treated plate 85 is joined to the grooved substrate 84 so that the exposed portion of heat generating resistor layer may be positioned to the corresponding portion of the liquid chamber, i.e., groove of the substrate to prepare a so-called thermal head. If desired, an $SiO_2$ layer may be formed as the protective layer on the external surface of the thermal head by the vapor-deposition.

Figure 17:
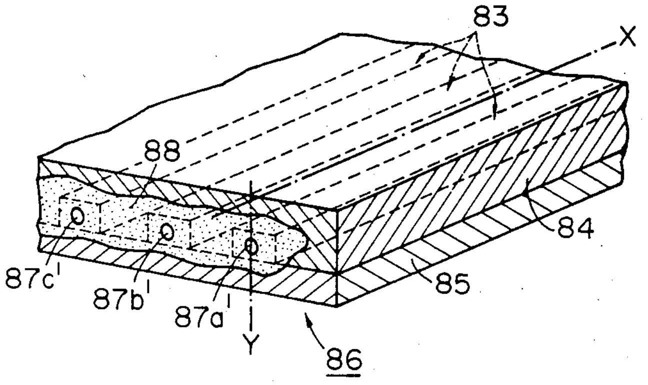

In the second step, as illustrated in FIG. 17, resin liquid 88 is deposited to the side surface of the liquid chamber portion 86 having the openings **87*a*, 87*b*, 87*c*** formed in the foregoing first step, by the immersion coating, brush coating, spray coating and other like coating method.

The size of the openings **87*a*, 87*b*, 87*c*** is usually in the range of 40 $\mu m \times 40$ $\mu m$ to 300 $\mu m \times 300$ $\mu m$ (the shape of the openings may be circular, in case of which the caliber is usually in the range of 40 $\mu m^{\phi}$ to 300 $\mu m^{\phi}$). However, according to the above mentioned method, it is extremely easy to make the caliber of the opening smaller, for example orifice size of about 5 $\mu m^{\phi}$ to 80 $\mu m^{\phi}$. Further, in the foregoing step, the opening size of the orifice and the shape of its cross-section may be easily regulated by controlling the viscosity of the resin liquid used and its surface tension and by varying the number of times of coating the resin liquid. For example, when the used resin liquid is of a relatively high viscosity, an orifice having the foregoing range of size may be formed by coating the liquid for one time. On the contrary, when a resin liquid of a low viscosity is used, the coating operation is repeated for a plurality of times to form an orifice of a desired caliber. In addition, the latter operation is more advantageous that the former operation in regulating the size and shape of the orifice.

In the foregoing second step. Appropriate openings are formed, in some cases, at the positions corresponding to the openings **87*a*, 87*b*, 87*c* only by coating the resin liquid, owing to the surface tension of the liquid itself. If openings are not obtained at that time, the corresponding portions are perforated, for example by a thin wire to form desired openings. The thus formed openings constitutes discharge orifices 87a', 87b', 87c'. The size of the orifices 87a', 87b', 87c' is made uniform as long as the preliminarily formed openings 87a, 87b, 87**c is uniform in the size. The shape of the cross-section of the orifices is substantially circular.

As the material for the resin liquid, there may be mentioned polyurethane, epoxide resin, phenoxy resin, phenolic resin, silicone resin, polyfluorocarbon, polyimide, polyamide, polyester, unsaturated polyester, polyvinyl chloride, polyvinyl fluoride, polyvinylidene chloride, polyvinyl acetate, polyethylene, polypropylene polystyrene, polymethyl methacrylate, polyvinyl alcohol, polyvinyl formal, polyvinyl butyral, dially phthalate, polysulfide, natural rubber, styrene-butadiene rubber (SBR), butadiene-acrylonitrile rubber (NBR), butyl rubber, chloroprene rubber and the like. These resins may be used singly, or dissolved in an organic solvent, or together mixed. Among them, the resin such as polyurethane, silicone resin, phenolic resin, epoxide resin and the like, which are cured to take the three-dimensional structure so that they may become insoluble in various solvents and not melted, is particularly preferable because they are of high durability against recording ink and the like.

The resin liquid may be prepared so as to have a viscosity of the following range. That is, in case of the resin liquid of non-solvent type (25° C.) such as epoxide resin, that having a viscosity of 100 cps-100,000 cps (25° C.), more preferably 10,000 cps-20,000 cps (25° C.), may be used. In case of the resin liquid prepared by dissolving resin such as polystyrene and the like in a solvent, that having a viscosity of C-$Z_7$ or so (25° C.) according to the Gardner-Holdt method is generally used. Particularly, that having a viscosity of Y-$Z_3$ or so is preferable.

After the foregoing second step, the coating of the resin liquid 88 is dried and cured to complete the essential part of the multi-array type recording head.

Figure 18:
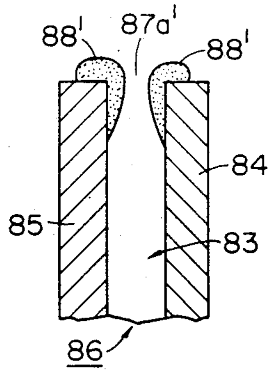
FIGS. 18 and 19 are schematic enlarged sectional views of the essential part of a recording head according to this invention.

Further, the cross-section of the head taken along the line X-Y of FIG. 17 is as illustrated in FIG. 18, in which numeral 84 denotes a substrate, 85 a plane plate, 86 a liquid chamber portion, 88' a resin cured film, and 87a' a discharge orifice.

The above mentioned manner will be further explained with reference to a concrete example. That is, a multi-array type recording head is prepared in the following manner.

First of all, glass plate is used to prepare a structure as shown in FIG. 16. At that time, the size of the openings is 150 μm×150 μm.

Next, a resin liquid is prepared from the composition:

| | |
|---|---|
| Epikote #828 (epoxide resin, supplied by Shell Chemicals Co.) | 100 parts by weight |
| EpomateB-002 (epoxide curing agent supplied by Ajinomoto Co., Inc.) | 40 parts by weight |

The resin liquid is dropped in a small amount onto each opening so that it is deposited to the circumferential walls of the opening. At that time, if an orifice is not formed in the liquid film in the opening, such liquid film is perforated, for example by tungsten wire of 40μ$^\phi$. In this operation, it is possible to form orifices of uniform size with ease.

After the structure is allowed to stand at room temperatures, when gelation is completed, the structure is heated at 60° C. for 3 hours to cure perfectly the resin liquid so that the formation of the orifices having a caliber of 40μ$^\phi$ is completed.

Figure 19:
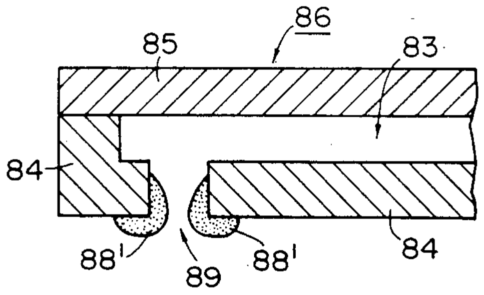

The position of the discharge orifice is not limited only to that shown in FIG. 18, but it may be optionally selected. For example, the orifice may be provided at the position in the direction perpendicularly intersecting the longitudinal axis of the liquid chamber portion, as illustrated in FIG. 19. In this drawing, the same component in FIG. 18 is represented by the same numeral provided that numeral 89 denotes a discharge orifice.

When the discharge orifice is regulated in such a manner as explained in the foregoing, a practically useful head for the ink jet recording is obtained which can allow ejection of ink droplets with good efficiency of energy, i.e., amount of the ejected ink droplets per input recording energy. At the same time, there is provided a method of manufacturing the head in a simplified manner with high accuracy.

The following will be given for the purpose of explaining a still further example concerning a method of forming the above orifice.

First of all, a plane plate 91 is prepared which is formed with a plurality of longitudinal grooves $90_1$, $90_2$, $90_3$, $90_4$, $90_5$, $90_6$ for constituting the liquid chambers of the ink jet recording head. The plate may be composed of glass, quartz, ceramics, plastics, metals, alloy or the like.

Figure 20:
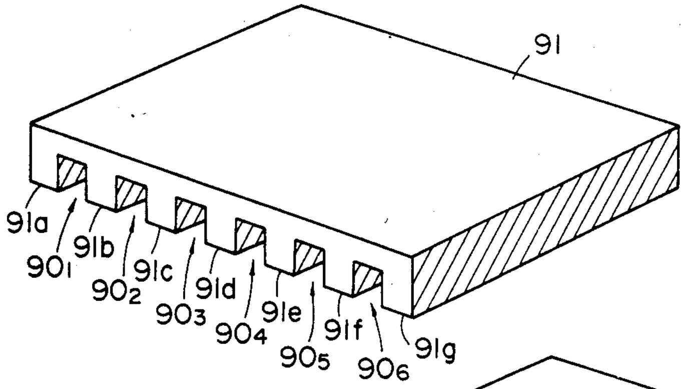
FIGS. 20 and 21 are schematic perspective views of the main elements constituting a recording head according to this invention.
Figure 21:
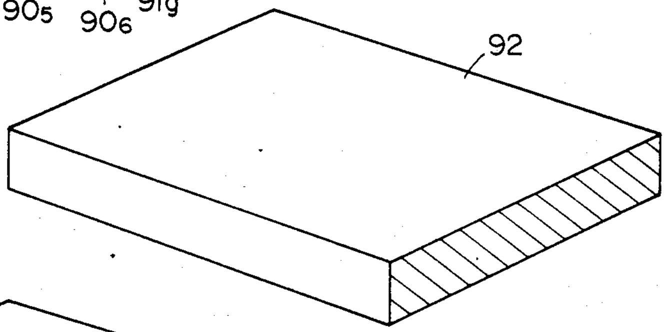

On the other hand, another plane plate 92 as shown in FIG. 21 is prepared which is composed of the same material as that of the plate 91 of FIG. 20.

Figure 22:
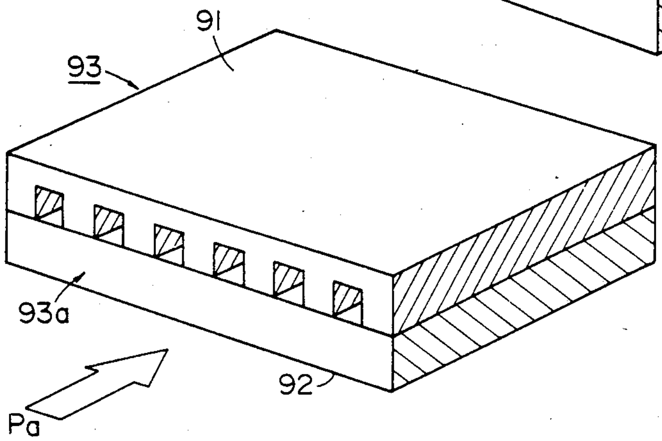
FIG. 22 is a schematic perspective view of a state in which the elements illustrated in FIGS. 20 and 21 are overlapped each other.

As the first step, the plate 91 is joined to the plate 92 so that the bank portions 91a, 91b, 91c, 91d, 91e, 91f, 91g in the plate 9' may be faced to one side of the plate 92. As a result, the essential portion 93 of the head is provided which has liquid chambers corresponding to the longitudinal grooves $90_1$–$90_6$ as illustrated in FIG. 22.

In case that the head is adapted to the foregoing ink jet recording based on heat energy, the following step (not shown in the drawing) is employed to form liquid chambers.

That is, $SiO_2$ is vapor-deposited on the plate 92 to form a heat storing layer, on which $Ta_2N$ and aluminum are vapor-deposited, in the named order, as a heat generating resistor layer and electrode, respectively. The aluminum electrode is formed with a desired pattern for example by the etching procedure to expose a portion of the heat generating resistor layer. The thus treated plate 92 is joined to the plate 91 so that the exposed portion of the heat generating resistor layer on the plate 92 may be positioned so as to be opposed to the groove in the plate 91. In this step, the so-called thermal head is obtained. If desired, a protective layer of for example $SiO_2$ may be formed on the external surface of the thermal head.

In addition, the grooves $90_1$–$90_6$ in FIG. 20 may be formed naturally by the cutting, etching or the like method. Alternatively, the plate 91 may be formed into the configuration shown in FIG. 20 by the shaping method so that the grooves $90_1$–$90_6$ and the bank portions 91a–91g may be shaped in the plate 91.

Figure 23:
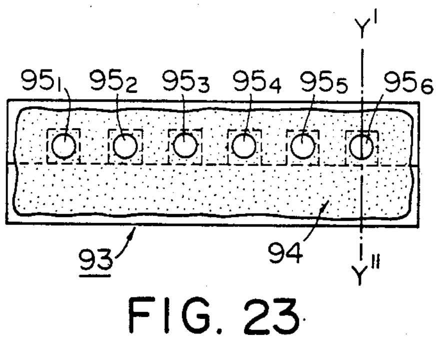
FIG. 23 is a schematic elevation of a surface as treated according to an example of this invention.

Next, as the second step, metal, metallic compounds or organic compounds are "deposited" to the side surface 93a of the structure 93 formed in the above step seen in the direction of arrow Pa in FIG. 22 to form a film 94 as shown in FIG. 23. The term "deposition" in the this sentence means that the metals, metallic compounds or organic compounds are vaporized or sprayed in the form of fine particles and thereafter caused to solidify and adhere firmly to an arbitrary surface. The metallic compounds include, for example metal oxides, metal borides and metal nitrides.

As the depositing means, there may be mentioned various means of forming a thin film. One of them is the vapor-deposition method in a vacuum. According to this method, metals such as gold, silver, copper, aluminum, paladium, platinum and the like, metallic compounds such as $SiO_2$, $Ta_2N$, $Ta_2O_5$, $ZrB_2$ and the like, and organic compounds, particularly polyxylylene resin and its derivatives can be deposited so as to form a film. The others are for example the sputtering method, ion plating method, vapor-phase growth method and plasma polymerization method. The sputtering, ion plating and vapor phase growth methods are known in the technical field of film formation as a method of depositing metals or metallic compounds so as to form a film. The plasma polymerization method is utilized as a method of depositing a monomer of organic compounds to form a film. The monomer polymerized by this method may include for example vinyl ferrocene 1,3,5-trichlorobenzene, chlorobenzene, styrene, ferrocene, picoline, naphthalene, pentamethylbenzene, nitrotoluene, acrylonitrile, diphenyl, diphenyl selenide, p-toluidine, p-xylene, N,N-dimethyl-p-toluidine, toluene, aniline, diphenylmercury, hexamethylbenzene, malononitrile, tetracyanoethylene, thiophene, benzeneselenol, tetrafluoroethylene, ethylene, N-nitrosodiphenylamine, acetylene, 1,2,4-trichlorobenzene, propane, thiourea, and thioacetamide.

Metals, metallic compounds or organic compounds are deposited to the side surface 93*a* of the structure 93 to form a film. As a result, the openings previously formed in the structure 93 are made narrower and modified into the substantially circular form. The thus treated openings $\mathbf{95}_1$, $\mathbf{95}_2$, $\mathbf{95}_3$, $\mathbf{95}_4$, $\mathbf{95}_5$, $\mathbf{95}_6$ are utilized as discharge orifices for ink droplets as illustrated in FIG. 23.

The orifices $\mathbf{95}_1$–$\mathbf{95}_6$ thus formed are made uniform in caliber as far as the openings preliminarily formed in the structure 93 are uniform in size. The opening caliber of the orifices and the shape of their cross-sections may be regulated with ease and high accuracy mainly by controlling the period of time during the above depositing operation. Since at that time, a uniform film is easily formed over the substantially entire surface to be treated, as compared with the conventional case of forming a film by the coating method, the multi-array of orifices having a fixed opening size and shape is stably provided which are not closed in spite of the minute openings and not plugged at all times.

The orifice size for the purpose of this invention is in the range of about 5 $\mu m^{\phi}$–200 $\mu m^{\phi}$, particularly preferably 5 $\mu m^{\phi}$–50 $\mu m^{\phi}$ the orifice of the size of which range may be formed easily with high accuracy from an opening of 50 $\mu m^{\phi}$–300 $\mu m^{\phi}$ or so according to the foregoing manner.

Figure 24:
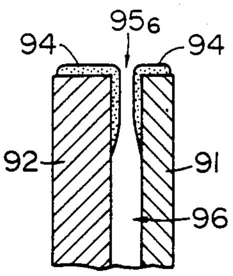
FIG. 24 is a sectional view of the main portion taken substantially along the line Y'-Y'' of FIG. 23.

For reference, FIG. 24 shows a cross-section taken along the line Y'-Y" of FIG. 23. In the former drawing, numerals 91 and 92 denote plane plates, 96 a liquid chamber, 94 a film formed by the deposition method, and $\mathbf{95}_6$ a discharge orifice.

Now, the foregoing procedure will be explained in more detail with reference to the fabrication of a recording head. That is, a head of the multi-array type is fabricated in the following procedure.

First of all, two sheets of glass are used to prepare a structure as shown in FIG. 22, which has a plurality of openings having a size of 100 $\mu m \times 100$ $\mu m$. Besides, three similar structures are prepared.

The deposition procedures are carried out on the surface of the opening side of each structure thus prepared, under the conditions described in the following table. Any of the deposition procedures provide recording heads having uniform discharge orifices as described in the table.

| | Conditions for treatment | | | |
|---|---|---|---|---|
| Example No. | Deposition procedure | Depositing material | Film thickness | Caliber of orifice |
| 1 | Vapor deposition in vacuum* | Al | 25 $\mu m$ | 40 $\mu m^{\phi}$ |
| 2 | Vapor deposition in vacuum* | Polyxylene | 20 $\mu m$ | 50 $\mu m^{\phi}$ |
| 3 | Sputtering* | $SiO_2$ | 10 $\mu m$ | 70 $\mu m^{\phi}$ |
| 4 | Plasma polymerization | Oxylene | 8 $\mu m$ | 75 $\mu m^{\phi}$ |

Note:
*The vapor deposition in a vacuum and sputtering method were effected while the surface to be treated.

In the following, preferred technique for preparing a recording device of the present invention will be explained. This technique is that for preparing an ink jet recording head comprising an inlet for supplying ink, a heat generating member for applying heat energy to the ink and a dishcharge orifice for ejecting the ink in the desired direction, in which the ink is ejected in the form of droplets from the orifice by applying the heat energy to the ink. Such preparing method comprises the steps of:

(a) providing a heat generating member on at least one substrate surface of a substrate having surface A formed with a groove and a substrate having surface B, and (b) adhering firmly the surface A to the surface B through a bond capable of providing a three dimensional network structure.

When the substrates having the groove and heat generating member are adhered firmly to each other with a bond capable of providing a three dimensional network structure as explained above, a recording head is obtained which is excellent in the discharging characteristics of ink droplets, i.e., efficiency of forming ink droplets, efficiency of economizing energy, efficiency of stabilizing formation of ink droplets, uniformity of ink droplets and heat response. Besides, a recording device having multi-array of orifices with high density can be prepared in a simplified manner with easiness in precision processing. Particularly, the obtained recording head allows stable formation of ink droplets in contrinuously discharging the ink droplets at high speed.

Figure 25:
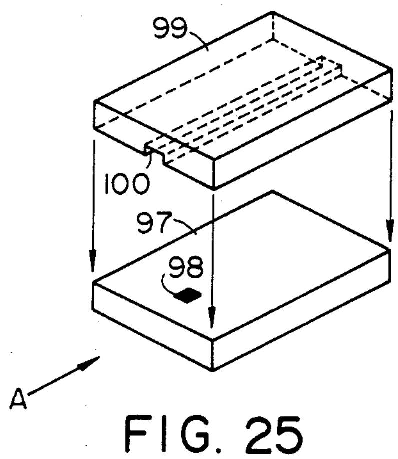
FIGS. 25, 26, 27 and 28 are explanatory views for showing the fabricating method according to this invention.

The fabrication of a recording head of the present invention will be explained below. FIG. 25 outlines such fabrication. Numeral 97 indicates a substrate (for example, aluminum substrate) provided with a heat generating member 98 on its surface. The heat generating member can be easily manufactured with a minute structure as a thermal head. The substrate 99 is provided with a groove 100 and may be made of glass, ceramics, heat-resistant plastics and the like. The sectional shape of the groove is not limited to the rectangle illustrated in FIG. 25 and may be any shape, for example triangle and semicircle.

The two substrates 97 and 99 are integrally adhered to each other with a bond so that the heat generating member 98 may be positioned correspondingly to the groove 100. Although not shown, electrodes and electrode leads for applying external signal are connected to the heat generating member 98. If desired, the heat generating member 98 may be covered with a protective layer.

Figure 26:
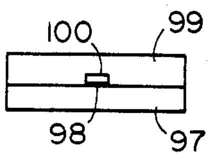

FIG. 26 shows a side view of the head thus prepared, seen from the side of the orifice, for example in the direction of the arrow A in FIG. 25. In the structure, ink is supplied into the device from the back side of the paper of the drawing, and heat acting portion for imparting the heat energy to the ink is formed in the vicinity of the heat generating member 98.

Figure 27:
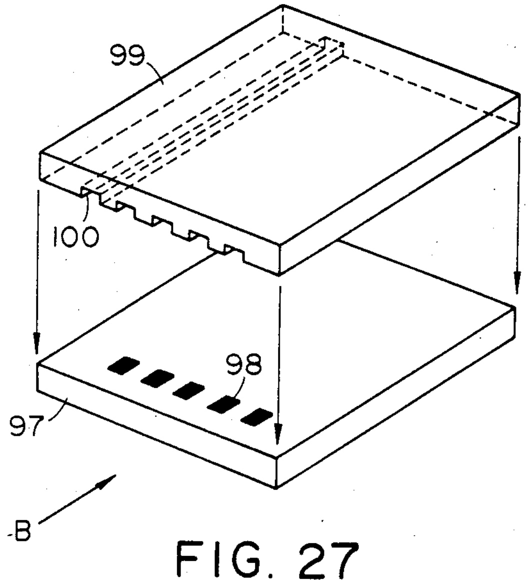
Figure 28:
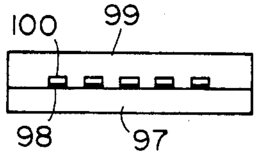

FIGS. 27 and 28 are, respectively, a perspective view of a head of a multi-array structure which is obtained by modifying the above mentioned head, and a side view seen in the direction of the arrow in FIG. 27. In FIGS. 25-28, the same component is denoted by the same numeral.

The recording head thus prepared is simplified in structure, minimized in size and easy in delicate processing and further can be modified into that of multi-array type with high density.

Figure 29:
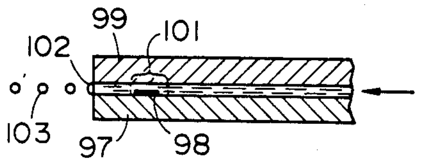
FIG. 29 is a sectional view for illustrating the ejecting principle of the recording head according to this invention.

Further, the principle of ejecting ink droplets from the head will be explained briefly. FIG. 29 illustrates a cross-section of the head along the groove 100. Ink is introduced into the head in the direction of the arrow. When a signal is input to the heat generating member 98 from the outside, heat generation takes place in the heat generating member 98 so that the heat energy is transmitted to the ink in the heat acting portion 101. The ink receives the heat energy to give rise to change in state, for example, expansion of the volume or formation of bubbles and hence change in pressure. The change in pressure is transmitted in the direction of the discharge orifice 102 so that ink droplets 103 are ejected.

As the bond providing the three dimensional network structure in the bond layer, there may be mentioned a bond of a thermosetting resin capable of giving a structure which is not dissolved and melted at normal temperature or by heating, as well as a complex bond obtained by blending a thermosetting resin with a thermoplastic resin for the purpose of the impact resistance, flexibility, size-stability and other physical properties of the thermosetting resin bond.

The material for the thermosetting resin bond may include, for example condensation product of formaldehyde with phenol, resorcinol, urea, ethylene urea, melamine, benzoguanamine, furan, xylene and the like; epoxide resin, unsaturated polyester, polyurethane, silicone resin, polydiallyl phthalate and copolycondensation products thereof. The material for the complex bond may include, for example, urea—at least one of polyvinyl acetate and polyvinyl alcohol; phenolic resin—at least one of polyvinyl acetate, polyvinyl formal, polyvinyl butyral, nitrile rubber, chloroprene rubber and nylon; melamine resin—at least one of acrylic resin, polyvinyl acetate and alkyd resin; epoxide resin—at least one of nylon, polyamide, acrylic resin, synthetic rubber, polysulfide, polyisocyanate, xylene resin and phenolic resin.

The thermosetting resin type bond used in the present invention will be further explained in detail. Preferred bond may be a urea resin type bond obtained from urea and formalin; a melamine resin type bond formed from melamine and formalin; a phenol-formalin resin type bond such as resol and novolak; resorcinol—formaldehyde resin type bond; m-xylene-formaldehyde resin type bond; a furan resin type bond such as furfural resin, furfural-phenol resin, furfuryl-alcohol resin, furfuralfuril resin, furfural-ketone resin, and the like.

As epoxy resins, the following may be mentioned. Glycidyl ether type epoxy resins derived from the folloiwng compounds:

(1) diglycidyl polyether of bis(4-hydroxyphenyl)dimethylmethane n=0-20

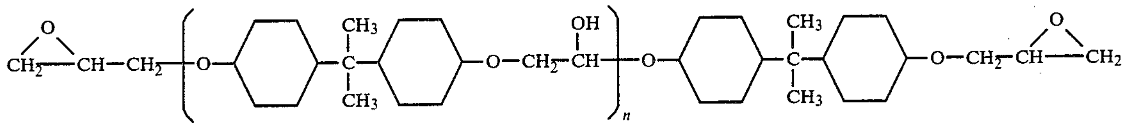

(2) diglycidyl ether of resorcinol

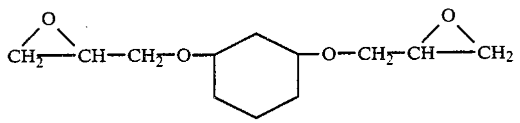

(3) glycidyl ether of tetrachlorobisphenol A

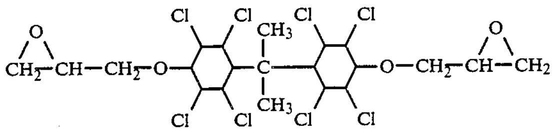

(4) diglycidyl ether of butanediol

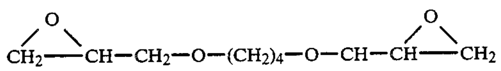

(5) diglycidyl ether of polypropylene glycol

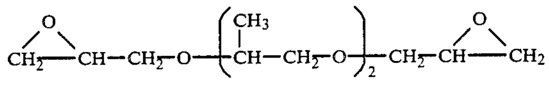

(6) 1,3-bis[3(2,3-epoxypropoxy)propyl]tetramethyl disiloxane

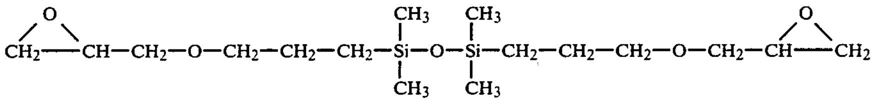
(7) tetragycidyl ether of glycerine
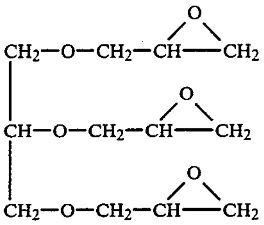
(8) triglycidyl ether of tris-(hydroxymethyl)phosphine oxide
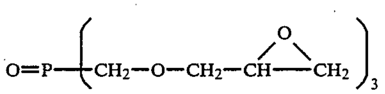
(9) triglycidyl ether of trihydroxyphenylpropane
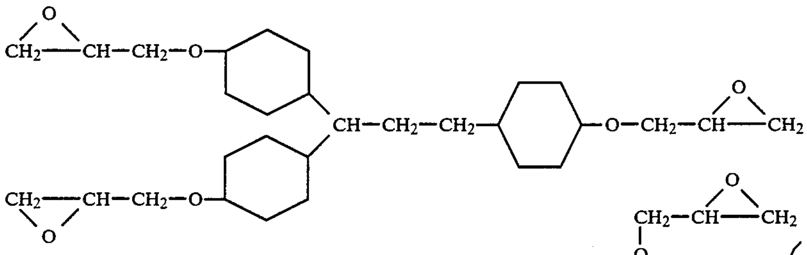
(10) polyacrylglycidyl ether
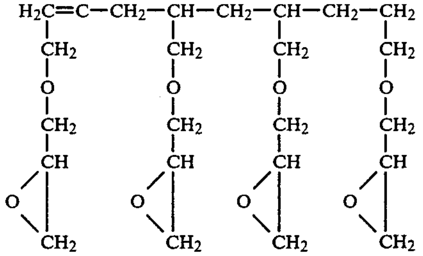
(11) tetraglycidyl ether of tetrakis(hydroxyphenyl)ethane
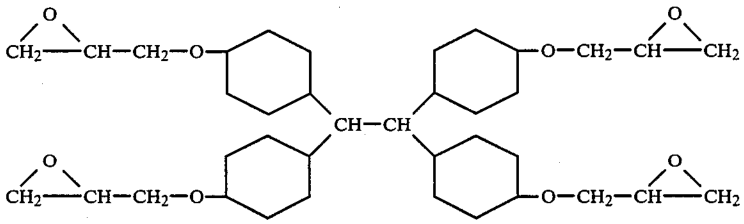
(12) epoxy novolak
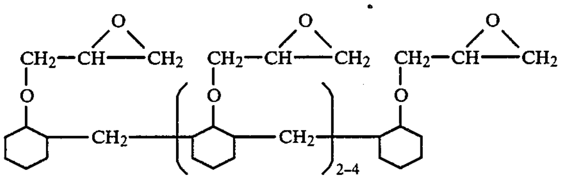
(13) cyclic silane epoxy
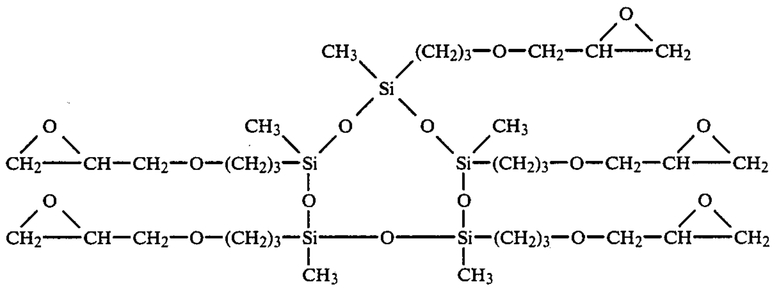

and the like.

Glycidyl ether type epoxy resins derived from the following compounds:

(14) phthalic acid glycidyl ester

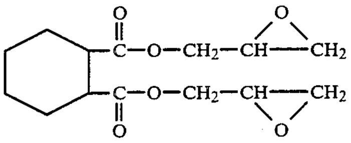

(15) diglycidyl ester of linoleic acid dimer

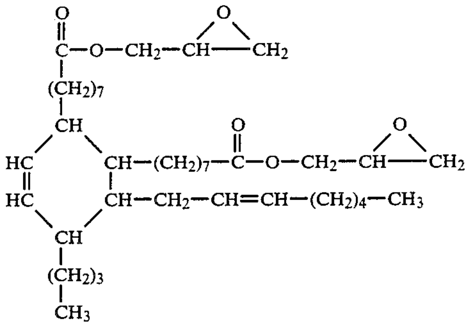

and the like.

Glycidyl amine type epoxy resins derived from the following compounds:

(16) N-diglycidyl aniline

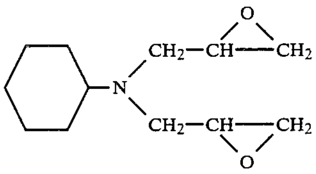

(17) 4,4'-di(methyl glycidyl)aminodiphenylmethane

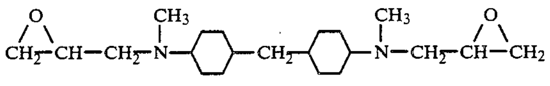

(18) glycidyl ether glycidyl amine of p-aminophenol

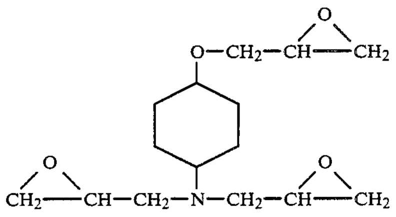

and the like.

Linear non-glycidyl type epoxy resins derived from the following compounds:

(19) polyolefine epoxide

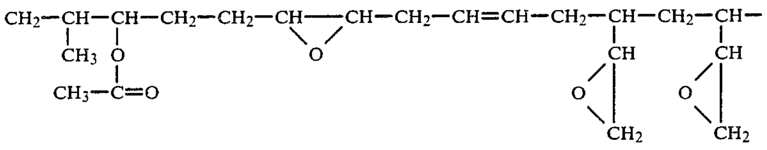

(20) soybean oil epoxide

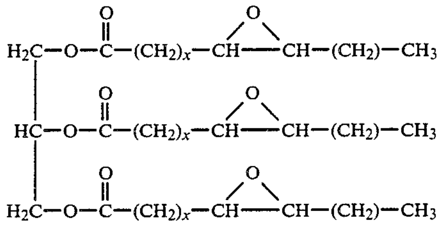

and the like.

Cyclic non-glycidyl type epoxy resins derived from the following compounds:

(21) vinylcyclohexane dioxide

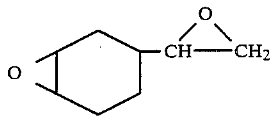

(22) lemonene dioxide

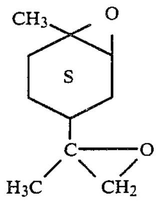

(23) dicyclopentadiene dioxide

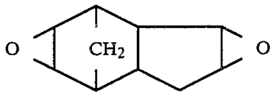

(24) bis(2,3-epoxycyclopentyl)ether

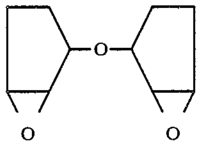

(25) bisepoxydicyclopentyl ether of ethylene glycol

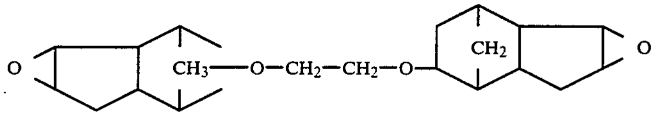

(26) 3,4-epoxy-6-methylcyclohexylmethyl-3,4-epoxy-6-methylcyclohexane carboxylate

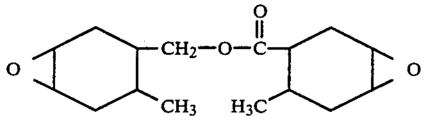

(27) bis(3,4-epoxy-6-methylcyclohexylmethyl)adipate

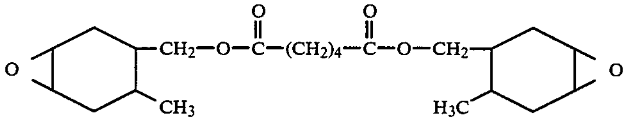

and the like.

Representative curing agents for the epoxy resins are shown in the following.

Aliphatic amines:

ethylene diamine
$NH_2—CH_2—CH_2—NH_2$ diethylene triamine
$NH_2—CH_2—CH_2—NH—CH_2.CH_2—NH_2$ triethylene tetramine
$NH_2—(C_2H_4—NH)_2—C_2H_4—NH_2$ dipropylene triamine
$NH_2—CH_2—CH_2—CH_2—NH—CH_2—CH_2—CH_2—NH_2$ dimethylaminopropylamine
$(CH_3)_2N—CH_2—CH_2—CH_2—NH_2$ diethylaminopropylamine
$(C_2H_5)_2—N—CH_2—CH_2—CH_2—NH_2$ cyclohexylaminopropylamine

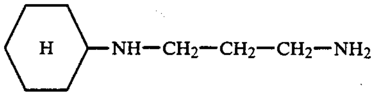

monoethyl amine
$HO—CH_2—CH_2—NH_2$ diethanol amine
$HO—CH_2—CH_2—NH—CH_2—CH_2—OH$ propanol amine
$HO—CH_2—CH_2—CH_2—NH_2$ N—methylethanol amine
$HO—CH_2—CH_2—NH—CH_3$ aminoethylethanol amine
$HO—CH_2—CH_2—NH—CH_2—CH_2—NH_2$ monohydroxyethyldiethylene triamine
$HO—CH_2—CH_2—NH—CH_2—CH_2—NH—CH_2—CH_2—NH_2$ bishydroxyethyldiethylene triamine

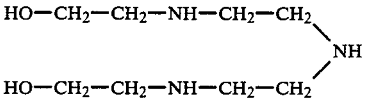

N—(2-hydroxypropyl)ethylene diamine

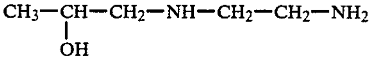

and the like.

Aromatic amines:

m-phenyl diamine

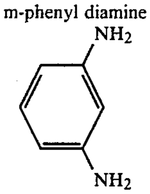

p,p'-diaminophenyl methane

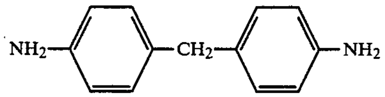

diaminodiphenyl sulfone

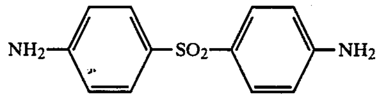

benzyl dimethylamine

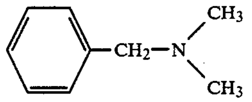

α-methylbenzyl dimethylamine

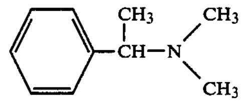

dimethylaminomethylphenol

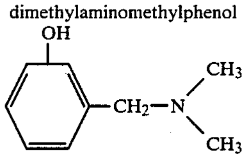

tridimethylaminomethylbenzene

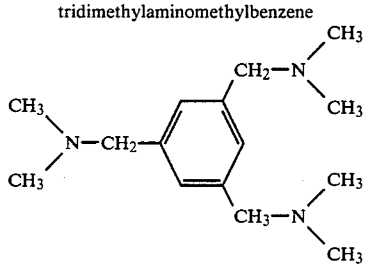

and the like.

Boron compounds and dicyandiamide:

boron trifluoride amine complex

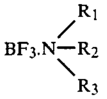

trialkanolamine borate

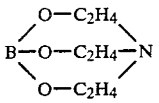

dicyandiamide

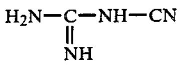

and the like.

Carboxylic acid compounds:

phthalic anhydride

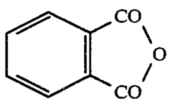

maleic anhydride

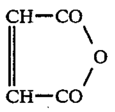

oxalic anhydride

HCO—O—OCH hexahydrophthalic acid

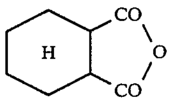

dodecenyl succinic anhydride

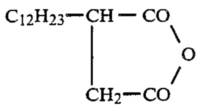

methyl endomethylene phthalic anhydride

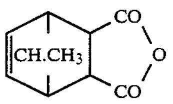

endomethylene phthalic anhydride

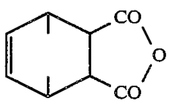

pyromellitic acid

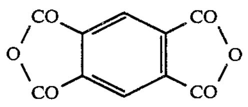

hexachloro endomethylene tetrahydro phthalic anhydride (Het acid)

-continued

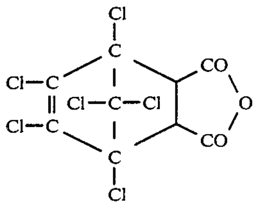

dichloromaleic anhydride

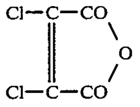

and the like.

Metal compounds having no nitrogen atom: $(BuO)_4Ti$, $Cu[Al(OBu)_4]_2$ and the like.

If desired, the following reactive diluting agents may be used.

propylene oxide (1)

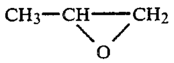

epichlorohydrin (2)

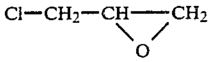

acrylglycidyl ether (3)

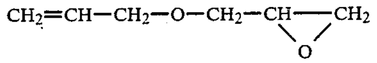

butyl glycidyl ether (4)

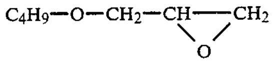

octylene oxide (5)

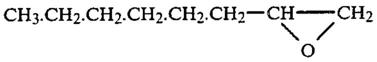

styrene oxide (6)

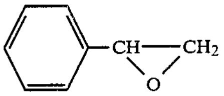

phenyl glycidyl ether (7)

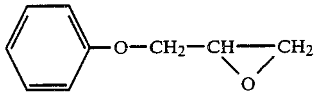

diglycidyl ether (8)

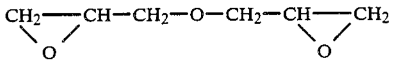

2-glycidylphenyl glycidyl ether

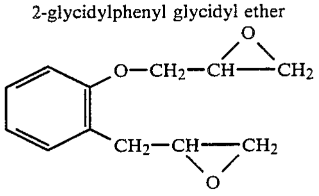

vinylcyclohexene diepoxide (10)

-continued

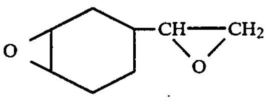

3,4-epoxy-6-methylcyclohexylmethyl 3,4-epoxy-6-methylcyclohexenecarboxylate (11)

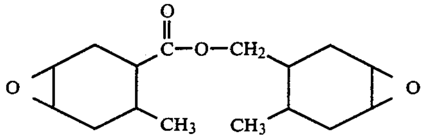

3,4-epoxycyclohexylmethyl 3,4-epoxycyclohexenecarboxylate (12)

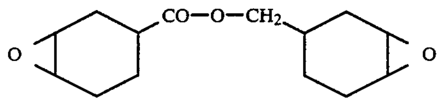

2,6-diglycidylphenyl glycidyl ether (13)

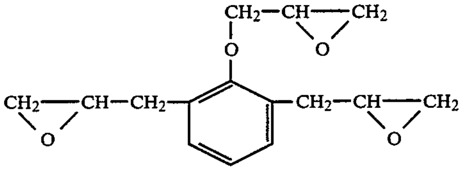

and the like.

Examples of polyisocyanate series adhesives used in the present invention are composed of an isocyanate compound such as tolylene diisocyanate, 3,3'-diloly-lene-4,4'-diisocyanate, metaphenylene diisocyanate, triphenylmethane-p,p', p''-triisocyanate, hexamethylene-1,6-diisocyanate, naphthalene-1,5-diisocyanate and the like, a compound selected from compounds having a hydroxyl group at the ends such as polyethylene glycol, alkylene diol and the like, compounds having polyamino groups, and compounds having polycarboxyl groups, and if desired, a catalyst such as amines, metal chlorides, organic metal salts and the like.

Examples of unsaturated polyester series adhesives used in the present invention are composed of a polycondensate derived from an unsaturated dibasic acid such as maleic anhydride and fumaric anhydride, a saturated dibasic such as phthalic anhydride, adipic acid and terephthalic acid, and a dihydric alcohol such as ethylene glycol and propylene glycol, and a vinyl monomer such as styrene, vinyltoluene, chlorostyrene, triallyl-cyanurate and the like, and if desired, a catalyst.

An example of silicone resin adhesives used in the present invention is composed of an organopolysiloxane and benzoyl peroxide as a curing agent.

An example of polydiallylphthalate resin adhesives is composed of a catalyst and diallyl orthophtalate:

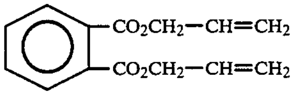

or diallyl isophthalate:

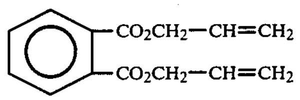

Composite thermosetting resin adhesives are obtained by blending the above mentioned thermosetting resin adhesives or blending one of the above mentioned thermosetting resin adhesives with a thermoplastic resin, and the composite thermosetting resin adhesives show initial adhesion force, thermal impact strength and flexibility better than single thermosetting resin adhesives.

Examples of combination of resins for obtaining the composite thermosetting resin adhesives are:

a combination of urea resin and at least one of polyvinyl acetate, starch, polyvinyl alcohol, melamine resin, and acrylic resin; a combination of phenolic resin and at least one of polyvinyl acetate, polyvinyl alcohol, polyvinyl formal, polyvinyl butyral, nitrile rubber, chloroprene, nylon, IIR, melamine resin, epoxy resin and xylene resin;

a combination of resorcinol resin and at least one of natural rubber latex, polyvinyl acetate, polyvinyl alcohol, pyridine rubber, phenolic resin and urea resin;

a combination of melamine resin and at least one of acrylic resin, polyvinyl acetate, alkyd resin, epoxy resin, and rubber latex;

a combination of epoxy resin and at least one of nylon, polyamide, acrylic resin, phenolic resin, nitrile rubber, polyisocyanate, polysulfide, xylene resin, silicone rubber, thiokol rubber, aniline resin and melamine resin; and a combination of polyisocyanate and at least one of phenolic resin, natural rubber, chloroprene rubber, polyacrylate, polyethylene glycol, and polyester.

These adhesives have various advantages for preparing the recording heads of the present invention. For example, upon preparing the recording head, these adhesives can be cured at a relatively low temperature (from room temperature to 200° C.) and therefore the electrode for driving the heating element is not subjected to undesirable oxidation.

In addition, these adhesives show excellent adhesivity to many kinds of materials and can produce a recording head of high durability.

Furthermore, the adhesives are of less volume shrinkage and high dimensional stability, high solubility resistance to an ink used and high heat resistance when once cured.

These advantages have a good effect on production of a recording head used for ejecting ink droplets by the action of heat energy and an ejection property of the resulting recording head for ejecting ink droplets. For example, the high dimensional stability results in precise and exact manufacturing of the minute structure which allows to form a system of high density multi-array orifice and also to prevent the durability from lowering because the solubility resistance to the ink and heat resistance are so high.

When an adhesive having no three dimensional network structure is used, the conduit of liquid in the recording head is choked or physical properties of the ink are disadvantageously changed and the ejection property is adversely affected, and as the result, the inherent advantages of the recording head which ejects ink droplets by heat energy can not be fully enjoyed.

However, when the above mentioned processes for production are employed, the recording device having such minute structure can be obtained without suffering from the above mentioned disadvantages.

Among the above mentioned adhesives, phenolic resin adhesives and epoxy resin adhesives are preferable, and in particular, epoxy resin adhesive is preferable.

The processes of production are not limited to those illustrated in the above mentioned Figures, but the following various embodiments can be employed.

Figure 30A:
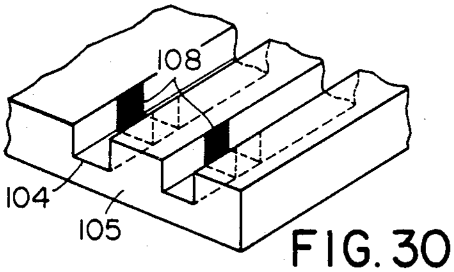
FIGS. 30(*a*), 30(*b*), 31 and 32 are explanatory views of still another embodiment.
Figure 31:
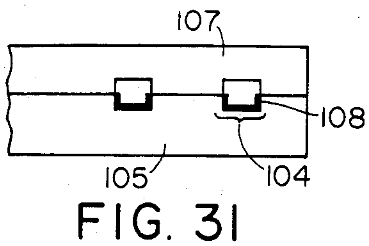
Figure 30B:
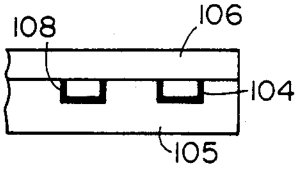
Figure 32:
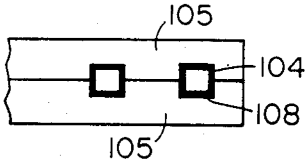

For example, referring to FIGS. 30(*a*) and (*b*), a plate 106 may be adhered to a base plate of heating element 105 having grooves 104. Further, a base plate of heating element 105 in FIG. 31 may be provided with grooves 104 and adhered to a plate having grooves 107. As illustrated in FIG. 32, two pieces of base plate 104 of heating element having grooves 105 may be adhered to each other. In these Figures, reference numeral 108 stands for a heating element.

According to the above mentioned processes, a high density multi-array orifice can be produced easily.

In particular, since an adhesive having a three dimensional network structure is used, the long time recording stability or durability of the recording head is improved and a practically usable recording head can be obtained.

Preferred embodiments of ink jet recording methods conducted by the recording devices of the present invention are described in the following.

One recording method is an ink jet recording process that the ejection response of ink droplets is improved and a high speed recording is possible and the ink is ejected through an ejection orifice by the action of heat energy and the ink is preliminarily heated (bias heating). By heating the ink preliminarily, heat energy of a recording signal effectively serves to formation of ink droplets and improves efficiency of ink droplet formation, energy efficiency, ejection response and the like to a great extent, and thereby a high speed recording can be easily conducted.

In addition, even when the environmental conditions for carrying the recording are subjected to variation, stability of ejection in a long time continuous recording can be retained.

Figure 33:
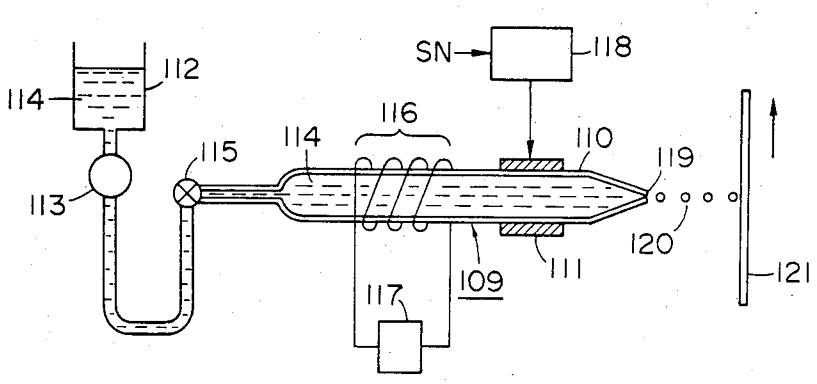
FIGS. 33 and 34 are explanatory views of an example of the recording method according to this invention.

This recording method can be carried out by a recording device which diagrammatial cross section is illustrated in in FIG. 33. In FIG. 33, a recording head 109 is provided with an electrothermal transducer (heating resistor) 111 such as so-called thermal head at a predetermined position in a liquid chamber 110. Ink 114 is introduced into liquid chamber 110 from an ink supplying portion 112 by an intermediate treating means 113 such as pump or filter, which applies a pressure to the ink. Valve 115 is used for adjusting the flow of ink 114 to liquid chamber 110. An important feature of this recording method is that around liquid chamber 110 there is disposed a preliminary heating means 116 for heating preliminarily ink 114 (bias heating). This preliminary heating means 116 is operated by a controlling device 117 comprising a temperature detecting means, a power source and the like. When a recording signal SN is applied to a signal treating means 118 (for example, pulse converter), the signal treating means 118 converts the signal SN into a pulse signal and the signal is applied to an electrothermal transducer 111. Upon this application, the electro-thermal transducer generates heat instantly and the resulting heat energy acts on ink 114 in the vicinity. And there occurs a change of state of the ink 114 (e.g. expansion of the volume or generation of bubbles) to cause a pressure change. This pressure change is transferred in the direction to an ejection orifice 119 and droplets of ink 120 are ejected through the orifice 119 and attach to a record receiving member 121.

Advantages of the above mentioned recording method are briefly described below. In general, such change of state of the ink caused by heat energy generated by an electrothermal transducer happens within a considerably short time. In particular, when the ink is not preliminarily heated, most of the heat energy thus generated are consumed without contributing to ejection of ink droplets. In other words, the heat energy is transferred to ink in the vicinity not to be vaporized as well as the ink to be directly heated and vaporized by the electrothermal transducer. Thus, ejection response of ink droplets of the recording head does not work satisfactorily.

One counterplan to improve such drawback is to increase electric power of the signal pulse (electric power applied to the electrothermal transducer), but this is not an effective method for improving.

For example, when pulse voltage of the signal is increased, durability of the electrothermal transducer is lowered and a large amount of heat is accumulated at the recording head and characteristics of the recording head are lowered. On the contrary, when the pulse application time is lengthened so as to increase the amount of power, the frequency can not be increased and thereby the recording speed is lowered. However, when the ink is preliminarily heated, heat energy caused by signal pulse is not so much consumed for heating the ink which does not change the state. Therefore, even a signal pulse of low energy can give a good ejection response of ink droplets and effect a high speed recording.

Preliminary heating temperature preferably ranges from room temperature (lower limit) to a temperature when a rapid and vigorous state change occurs (boiling point of the ink solvent) (upper limit).

For the purpose of improving ejection response of ink droplets, it is preferable that the preliminary heating temperature is as high as possible, but when the ink is heated to a temperature near the boiling point, the temperature is unstable since it is difficult to balance the consumption amount of ink with the generated heat amount, and sometimes there happen unnecessary state change and unnecessary ejection of ink. Therefore, the temperature is usually adjusted to a range of from room temperature to a temperature which is by 2°-3° C. lower that the boiling point of the ink solvent.

Figure 34:
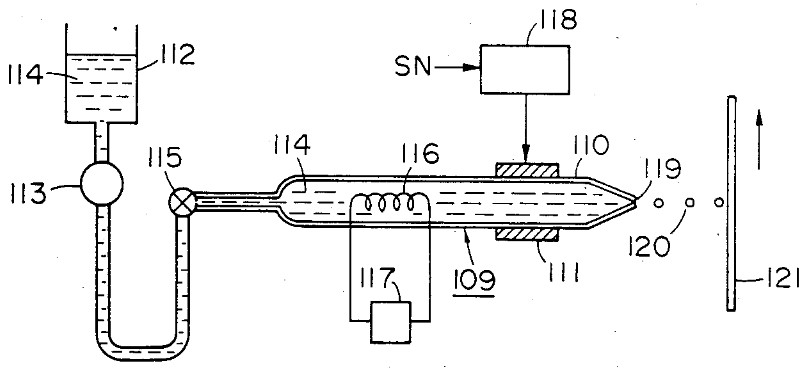

FIG. 34 illustrates another embodiment where a means for preliminary heating 116 is disposed in a liquid chamber 110. The means for preliminary heating 116 may directly contact ink 114, but it is preferable to dispose a coating layer on the heating surface (an indirect heating type) so as to prevent the ink from chemically reacting on the heating surface and forming a deposite.

Still further embodiments are covering an electrothermal transducer with a means for preliminary heating, overlying them, disposing the electrothermal transducer and the means for preliminary heating side by side, disposing the means for preliminary heating all over the liquid chamber, fitting the means for preliminary heating to the ink feeding pipe, or the like.

For simplifying the explanation, a single orifice type is illustrated in FIG. 33 and FIG. 34, the above mentioned recording method also serves to improve the ejection response of ink droplets and achieves a high speed recording when applied to a multi-array orifice type recording device.

When a means for preliminary heating provided with a temperature controlling device is used, it is possible to suppress change of physical properties of ink upon variation of environmental conditions such as temperature, humidity and the like so that there can be continuously obtained a stable recording for a long time.

Further, it is possible to set a temperature condition capable of giving the best recording characteristics under a given condition by controlling temperature.

Such recording method is explained in the following.

Figure 35A:
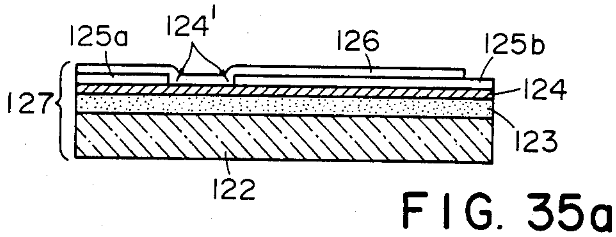
FIGS. 35(*a*), 35(*b*), 35(*c*) and 36 are schematic views of the main part of the recording head used in the method explained in FIGS. 33 and 34.
Figure 35B:
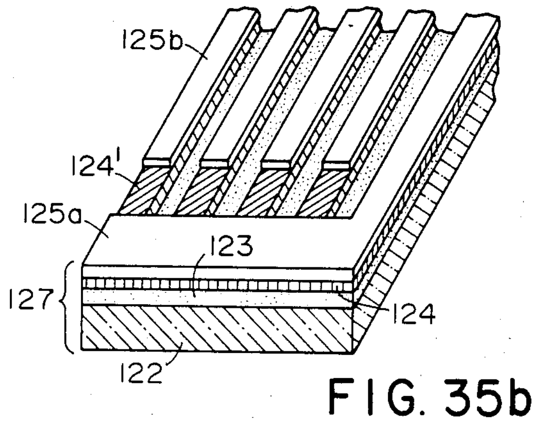
Figure 35C:
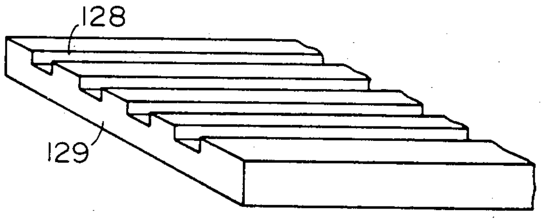

A base plate of heating element and a grooved base plate are prepared as illustrated in FIGS. 35(*a*), (*b*) and (*c*).

An aluminum base plate 122 (26 mm×10 mm) of 5 mm thick is subsequently provided with an $SiO_2$ layer 123 (4 microns thick), a $ZrB_2$ layer 124 (8000 Å thick), and an aluminum layer (5000 Å thick) by sputtering, and the aluminum layer is selectively removed by photoetching to form a heating portion 124' (a $ZrB_2$ layer of 200 microns×200 microns, 70 ohm), a common electrode **125*a* and a separated selection electrode 125*b* (an aluminum layer of 200 microns×15 mm). Thus an electrothermal transducer is produced. Then an $SiO_2$ layer 126 (1 micron) is deposited thereon as a protecting layer by sputtering. Cross sectional view of the resulting heating element base plate 127 is shown in FIG. 35**(*a*) and its oblique view is shown in FIG. 35(*b*), (In FIG. 35(*b*) a protecting layer 126 is not shown).

On the other hand, there is produced a grooved base plate 129 composed of a glass plate (15 mm×10 mm) of 1 mm thick having grooves 128 of 300 microns wide and 150 microns in depth (density of 2 lines/mm) which are formed by a diamond cutter, and the resulting grooved base plate 129 is adhered to the above mentioned heating element base plate 127.

Figure 36:
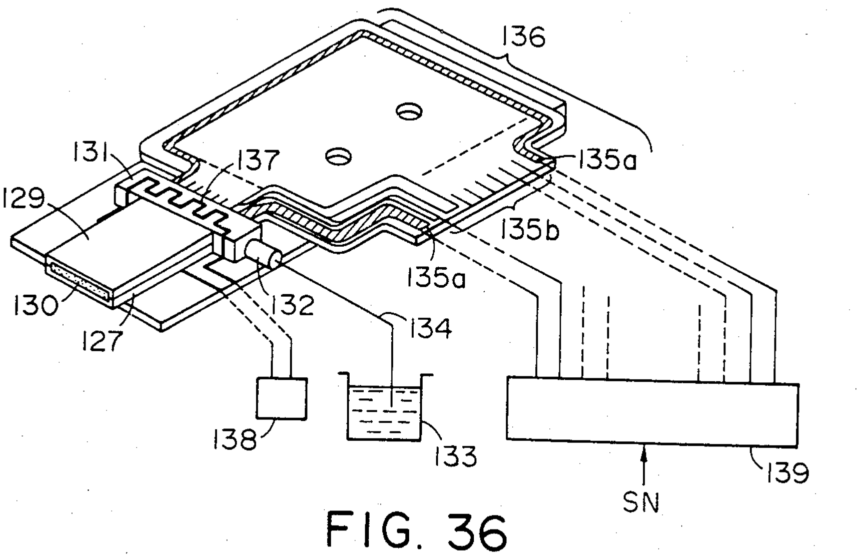

Then a discharging orifice plate 130 having a hole of 80 microns in diameter, a liquid supplying chamber 131, an introducing pipe 132 and the like are adhered thereto to produce a recording head as illustrated in FIG 36. A liquid is fed to the introducing pipe 132 through a feeding pipe 134 from a liquid supplying porton 133. Behind the liquid supplying chamber 131 is disposed a lead base plate 136 having leads **135*a* and 135*b* connected to the common electrode 125*a* and the selection electrode 125*b*, respectively. And around the liquid supplying chamber 131 is disposed a heater 137** for preliminary heating.

In the above mentioned recording head, the recording head is driven by signal SN which is subjected to pulse conversion by a means for treating signal 139 while the ink is preliminarily heated at a constant temperature by a heater 137 connected to a controlling portion 138 having a power source and a means for detecting temperature. The ink is mainly composed of n-propanol (b.p. 98° C.) Minimum voltage necessary for ejection of ink and response frequency are compared at various preliminary heating temperature where pulse width of a signal pulse is 20μ sec. The result is shown in Table 1.

TABLE 1

| Preliminary heating temperature | Minimum voltage (V) required | Maximum response frequency (KHz) |
|---|---|---|
| 20° C. (room temperature) | 28 | 3.5 |
| 60° C. | 20 | 5.2 |
| 90° C. | 10 | 9.1 |

When a signal pulse has a constant voltage 28 V and the pulse width is varied, the response frequency is as shown in Table 2.

TABLE 2

| Preliminary heating temperature | Pulse width (μ sec.) | Maximum response frequency (KHz) |
|---|---|---|
| 20° C. (room temperature) | 20 | 3.5 |
| 60° C. | 10 | 7.5 |
| 90° C. | 2 | 15 |

In view of the above results, the preliminary heating serves to lower the voltage of signal pulse, improve the ejection response, and enable to record at a high speed. A continuous recording is carried out for a long time with varied ambient temperatures and a good result is obtained.

Another preferable embodiment is a process for ink jet recording by heat energy which comprises heating an ink in a liquid chamber having a discharging orifice by a heating element, thereby causing a state change of the ink, ejecting the ink droplets through the orifice in correspondence with an increase in the inner pressure of the liquid chamber based on the state change, and effecting recording on a record receiving member and the portion of the above mentioned heating element being subjected to a forced cooling.

According to such process for recording, rapid lowing of surface temperature of the heating element can be carried out by cooling the heating elment base plate, and therefore heating the ink around vapor bubbles can be reduced so that the formation of bubbles from the dissolved oxygen and the like can be suppressed and the frequency response of ink ejection can be improved and simultaneously the frequency response as to temperature of the heating element itself can be improved and as the result, a high speed ink jet recording can be effected.

The reason why heating the ink near vapor bubbles can be suppressed by cooling the base plate of heating element is explained below.

Figure 37:
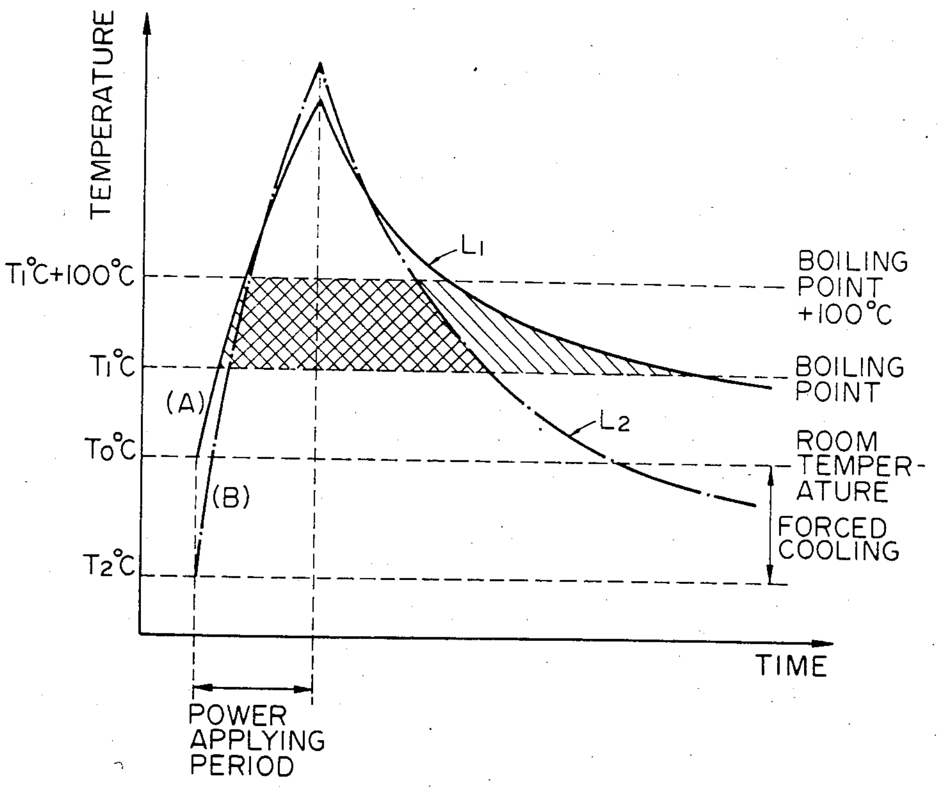
FIG. 37 is a graphical representation of change in temperature obtained in case ($L_1$) that a substrate having a heat generating member formed thereon is allowed to stand at room temperatures and in case ($L_2$) that such substrate is forced to be cooled.
Figure 38:
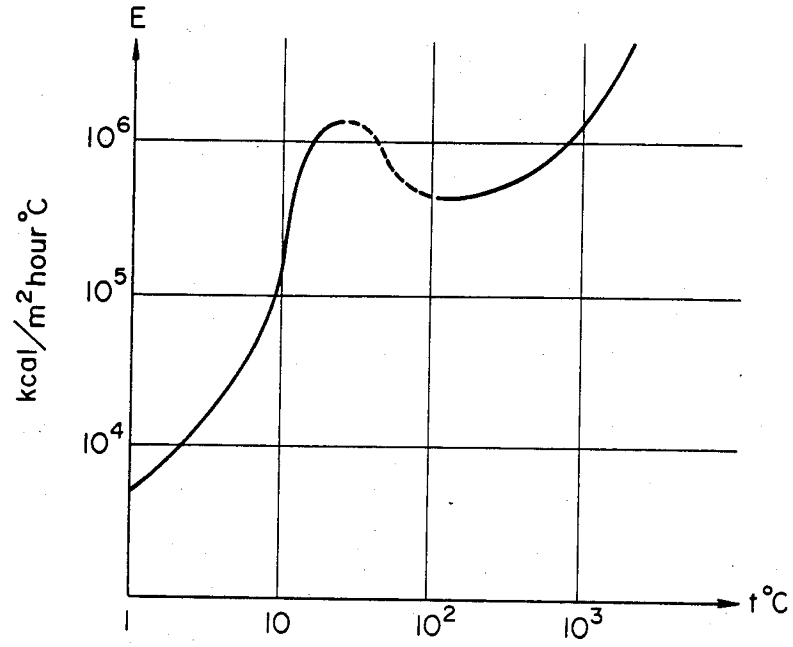
FIG. 38 is a graphical representation for showing mutual relation of difference in temperature between the boiling point of water and temperature of the heat generating member to energy to be transmitted to water.
Figure 39:
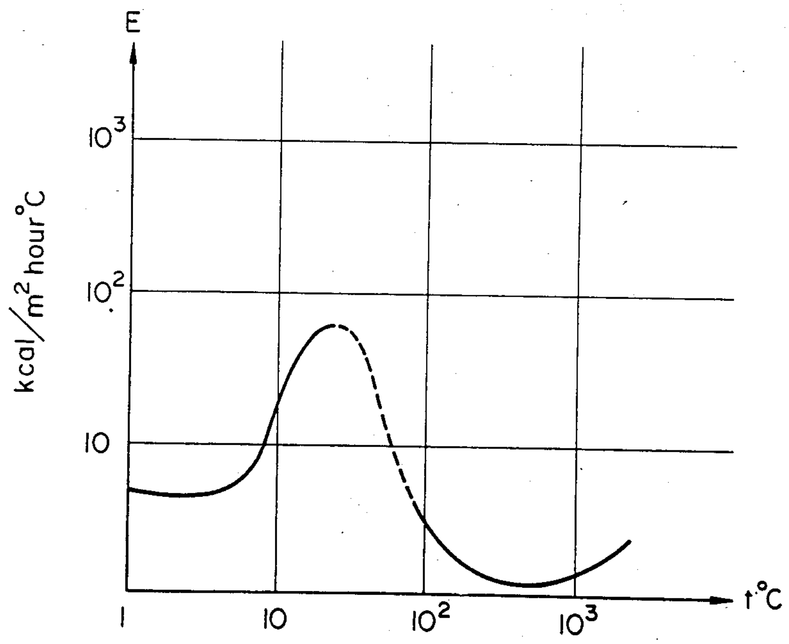
FIG. 39 is a graphical representation for showing mutual relation of difference in temperature between the boiling point of water and temperature of the heat generating member to energy to be transmitted to the circumferential water per unit bubble of vapor steam.

Temperature change lines $L_1$ and $L_2$ in the graph of FIG. 37 represent temperature change necessary for obtaining the same size and speed of ejected droplets when a power having pulse width as shown at the abscissa in FIG. 37. $L_1$ corresponds to a case where the base plate temperature $T_0$°C. is room temperature while $L_2$ corresponds to a case where the base plate is forcedly cooled to $T_2$°C. Temperature of $L_2$ drops rapidly and therefore, the peak temperature necessary for obtaining similar ejected droplets is higher than that for $L_1$ and the energy amount applied is somewhat more than that in case of $L_1$. However, the temperature drops so rapidly that the time of staying between the boiling point ($T_1$) of the ink and ($T_1$°C.+100° C.) (refer to the hatched portion in FIG. 37) is short. This indicates that heating around vapor bubbles hardly occurs in view of FIG. 38. In FIG. 38, a temperature difference t°C. between the surface temperature of the heating element and boiling point of water (100° C.) is plotted as abscissa and the energy transferred to the ink from the heating element E (Kcal/$m^2$ hour) as ordinate (cf. Y. Koto: "Dennetsu Gairon (Introduction to Heat Transfer)", p. 296, published by Yokendo). From practical point of view, it is very important in ink jet recording methods by heat energy how much het energy is transferred to the ink around the vapor bubbles to make sure of a certain volume of vapor bubble and how much heating is suppressed. Volume of the vapor bubble is almost proportional to the temperature difference between the heating element and ink as far as a pulse-like heat energy is applied for a constant time and therefore, when FIG. 38 is changed to FIG. 39 where the temperature difference t°C. between the boiling point of ink and the heating element is plotted as abscissa and energy transferred to the environmental ink during making sure of a unit vapor bubble volume $E^v$(Kcal/$m^2$·hour·°C.) is plotted as ordinate, it is found that a region where heating the environmental ink is difficult is at a temperatures higher than (boiling point+100° C.). In other words, when the surface temperature of the heating element remains at a temperature range between the boiling point $T_1$°C. and ($T_1$°C.+100° C.) for only a short time as shown by the curve $L_2$ in FIG. 37, the environmental ink is less heated and generation of gas such as that generated from dissolved oxygen is difficult. FIG. 38 and FIG. 39 are concerned with water, and in general, vaporization of a liquid follows such process as mentioned above. That is, when the temperature of the heating element is a little higher than the boiling point of the ink, heat energy can be easily transferred to the ink from the heating element through the ink comprising a solvent of high thermal conductivity, but when the temperature of the heating element is much higher than the boiling point of the ink (in case of water, it is higher than about 200° C., i.e. (boiling point+100° C.)), a vapor bubble which is a driving force for ejection is rapidly formed as a film between the heating element and the ink, and the resulting vapor film is a gas and therefore the thermal conductivity is so low that heat energy is transferred to the ink with difficulty.

According to this method, the rapid temperature drop as shown by $L_2$ in FIG. 37 is realized by cooling the heating element base plate. That is, since the temperature change follows a curve gradually approaching the base plate temperature when supplying of pulse-like heat energy is stopped, it is very effective for obtaining a rapid temperature change near the boiling point to lower the base plate temperature, and such procedure serves to decrease heating the environmental ink and decrease generation of gas such as that from dissolved oxygen and thereby frequency response of ink droplet ejection can be improved.

Cooling of the base plate may be controlled within a temperature range from room temperature to a solidifying temperature of ink by using a Peltier element or a usual refrigerator. The lower the base plate temperature, the rapid the temperature mage. However, when the temperature is too low, viscosity of ink disadvantageously increases, and therefore, it is preferred to control the temperature to a range of 0° C.-50° C.

Some examples are shown below.

A single head is employed here, but cooling the base plate is also effective for a recording head of multiarray orifice type.

Figure 40:
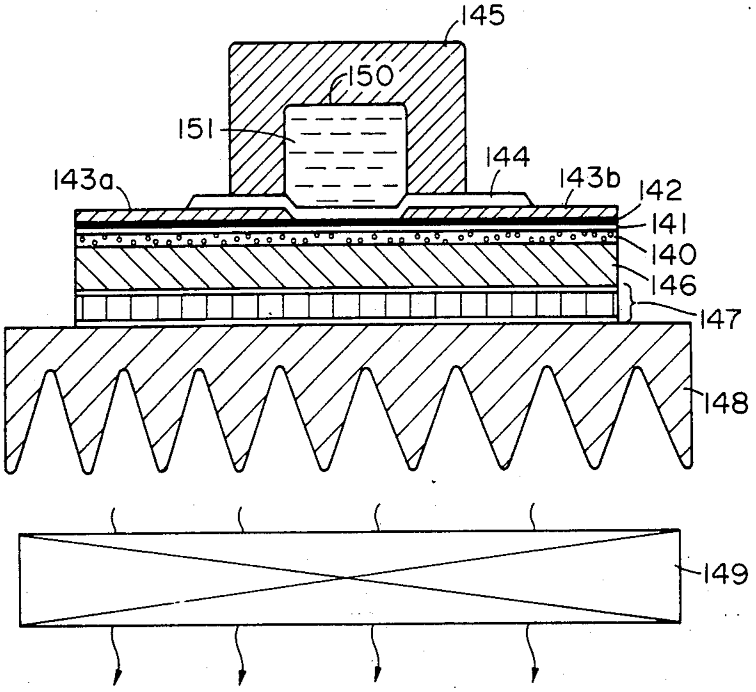
FIG. 40 is a schematic sectional view of the constitution of a still further example.

Referring to FIG. 40, an $Al_2O_3$ base plate of 0.6 mm thick 140 is subjected to a sputtering treatment to form an insulating layer 141 composed of $SiO_2$ of 3 microns thick on the $Al_2O_3$ base plate 140, and then to form subsequently a heating resistor 142 composed of $HfB_2$ of 500 Å thick, and electrodes **143*a* and 143*b* composed of aluminum of 5000 Å thick. Then a photoetching treatment is applied to the above laminate to produce a heating element (200 microns×500 microns). Further a protecting layer 144 composed of $SiO_2$ of 0.5 microns thick is formed thereon by sputtering to complete a heating element member. A grooved plate 145** having grooves of 300 microns wide and 200 microns deep is adhered to the exposed portion of the heating element in such a manner that the grooves face the exposed portion of the heating element. Thus a liquid chamber is produced. An orifice plate is adhered to one end of the liquid chamber and an ink inlet channel is adhered to the other end.

Then the base plate 140 is bonded to an aluminum plate 146 of 5 mm thick and the temperature of aluminum plate 146 is controlled to 20° C.-60° C. by using a Peltier cooler 147, heat discharging fin 148 and a fan motor 149. The ink used is that mainly composed of n-propanol. Resistance of the heating element is about 30 ohms. A rectangular shaped voltage of 10μ sec. is applied at a predetermined value of voltage, and repeating frequency limits for obtaining a stable ejection are compared by using the temperature of aluminum plate 146 as a parameter.

The result is shown in Table 3 below. This indicates that the limit of frequency response increases as the aluminum plate 146 is cooled. Reference numerals 150 and 151 stand for a liquid chamber and ink, respectively.

TABLE 3

| Temperature of Al plate (°C.) | Applied voltage (V) | Frequency response limit (KHz) |
|---|---|---|
| 20 | 30 | 5 |
| −20 | 33 | 12 |
| −60 | 35 | 20 |

A further embodiment of the present invention is shown below.

It is an ink jet recording device by ejecting ink droplets through a discharging orifice by the action of heat energy which comprises a recording head comprising a discharging orifice for ejecting droplets of a liquid recording medium such as ink, an inlet channel for introducing the liquid recording medium, a liquid chamber containing the liquid recording medium, and a heating element for supplying heat energy to the liquid recording medium, a means for causing a mechanical pressure change of the liquid recording medium introduced into the liquid chamber, a means for controlling synchronization of the heat energy action to the liquid recording medium with the generation of the pressure change, and a means for applying voltage pulse so as to actuate the heating element to generate heat.

In such ink jet recording device, the element fitted to each discharging orifice is miniaturized to a great extent and it is possible to produce a high density multi-orifice system without complicating and enlarging the whole system structure. Further, the ejection efficiency and ejection response are improved and the multi-orifice system can be easily produced, and as the result, a high speed recording can be easily achieved.

Figure 41:
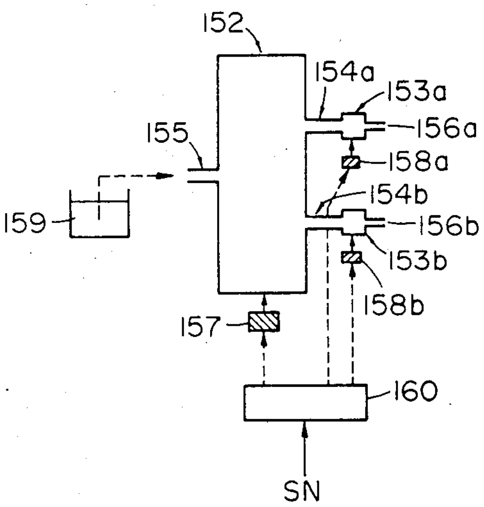
FIG. 41 is an explanatory view of the essential constitution of still another embodiment according to this invention.

Referring to FIG. 41, a fundamental constitution of a device of the embodiment is illustrated. Ink is introduced into the head portion through an inlet 155 from a supplying portion 159 composed of a supplying tank, a feeding pipe (not shown) and if desired, a filter, and the like.

The head portion possesses a liquid chamber 152 similar to that shown in the above mentioned example with respect to the detailed structure, heat applying portions for applying heat energy 153*a* and 153*b*, discharging orifices 156*a* and 156*b* disposed to each of the heat applying portions.

Liquid chamber 152 is connected to heat applying portions 153*a* and 153*b* by means of for example, conduits 154*a* and 154*b*, which may be common or separated, or are not always necessary if the heat applying portion are arranged in liquid chamber 152.

The inside wall or outside wall of liquid chamber 152 is provided with a means 157 for causing a mechanical pressure change of the ink in liquid chamber 152. This means 157 may be that which causes a pressure change by changing the volume of liquid chamber 152 or by vibrating the liquid chamber in the direction of ejection.

Heat applying portions 153*a* and 153*b* are provided with heat energy generating means 158*a* and 158*b*.

As the above mentioned means for causing a mechanical pressure change 157, for example, an electromechanical transducer such as a piezoelectric element, a device for vibrating a metal plate integrated with a coil by electromagnetic induction, and the like, is used.

As heat energy generating means 158*a* and 158*b*, there is used, for example, an electrothermal transducer such as a thermal head, which is a very precise element having a density of at least 10 lines per 1 mm.

As a heat energy generating source, a high energy radiation such as laser may be used. In such case, 158*a* and 158*b* are appropriate optical systems having a deflector selected from electro-optical elements, acoustic optical elements and the like for applying selectively heat energy to the heat applying portions 153*a* and 153*b*. In this case, a high density multi-orifice system is very advantageous.

In the above mentioned example, the device is provided with a control portion 160 for actuating the pressure change generating means 157 and the heat energy generating means 158*a* in a synchronized manner.

The control portion 160 has, for example, a power amplifying circuit and a timing circuit and has functions such as selecting heat energy generating means 158*a* and 158*b* which are actuated in response to image signals, actuating energy generating means 158*a* and 158*b* in connection with pressure change generating means 157 in a well-timed manner, applying an appropriate signal voltage to the element, setting conditions for generating ink droplets at the best state, and the like.

In FIG. 41, there is shown an example where one liquid chamber is provided with two heat applying portions and discharging orifice, but in general, more heat applying portions and discharging orifices are arranged.

Principle of function of the above mentioned device is briefly explained below.

As the recording signal SN, when, for example, a signal which requests to eject the ink from the discharging orifice comes, the control portion 160 selects the mechanical pressure change generating means 157 and the heat energy generating means 158*a*, and their actions are synchronized. In this case, when only one of these means is actuated, ejection of ink does not occur, but when both means are actuated, the pressure change of ink caused by volume change of liquid chamber 152 and the pressure change due to the change of state (for example, volume expansion or formation of bubble caused by heat energy) occur substantially at the same time to result in ejection of ink.

"Synchronizing", "occurring at the same time", or something like that, does not always mean that the pressure change generating means 157 and the heat energy generating means 158*a* (or 158*b*) are completely and exactly synchronized or work exactly at the same time. It includes that pressure change caused by these means is transferred to the ink in the vicinity of the discharging orfice to eject ink.

Figure 42A:
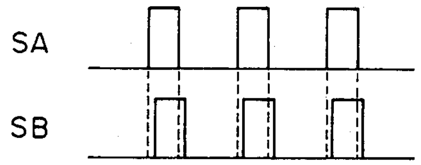
FIGS. 42(*a*), 42(*b*) and 42(*c*) are explanatory views for showing timing of applying signal to the element.
Figure 42B:
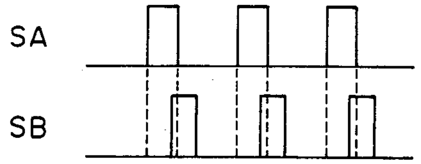
Figure 42C:
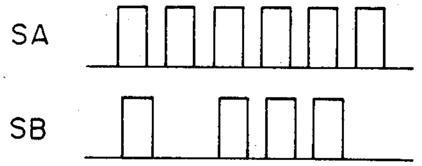

In general, it takes a certain definite time that the pressure change caused by the volume changing means is transferred in the direction to the discharging orifice. Therefore, the heat energy generating means 158*a* is actuated after a predetermined time. For example, as shown in FIG. 42(*a*), a signal SA applied to the pressure change generating means 157 and a signal SB applied to the heat energy generating means 158*a* (or 158*b*) are applied substantially at the same time. Or, the signal SB may be applied later than signal SA as shown in FIG. 42(*b*).

The time difference between application of signal SA and that of signal SB is determined depending upon the following factors:

physical properties of ink (viscosity, surface tension, thermal expansion, specific heat and the like), change of volume of liquid chamber 152 caused by the means 157, amount of heat energy generated by the means 158*a* and 158*b*, amount of signal energy for actuating means 157, 158*a* and 158*b* (voltage, time), shape of wave of the signal, diameters of conduits and discharging orifices and the like parameters.

In FIGS. 42(*a*), (*b*) and (*c*), the wave shape of signals SA and SB is rectangular. However, various other shapes such as trapezoid, triangle, since curve and the like, may be used.

As a method for actuating a means for generating mechanical pressure change in ink 157 and a means for generating heat energy 158*a* and 158*b*, these means may be actuated only when the ink is ejected as shown in FIGS. 42(*a*) and (*b*), or the means for generating pressure change 157 is continuously actuated upon actuating the device as shown in FIG. 42(*c*) by a signal of SA (i.e. generating a pressure change which is not sufficient for ejection of ink) and the means for generating heat energy 158*a* (or 158*b*) is actuated by a signal SB only when ink is ejected, and as the result, the total of these pressure changes effects ejection of ink droplets.

The above mentioned device is very suitable for a high density multi-orifice system or a high speed recording.

Heretofore, size of conventional devices of this kind such as a device for ejecting ink by a piezoelectric element only can not be made so small since the small device can not generate a sufficient energy for ejection, and therefore it is difficult to use the device in a form of a multi-orifice system. In general, it is very difficult to make even a discharging orifice per several mm.

On the contrary, according to the present invention, elements (electrothermal etc.) attached to each discharging orifice are so small and precise that it is easy to make a high density multi-orifice system comprising several tens of discharging orifice per 1 mm, and the recorded image density can be improved.

In addition to the above mentioned advantages, there are following advantages.

Since the energy necessary for ejecting ink droplets is generated by the means for changing the volume of liquid chamber and the means for generating heat energy at the heat acting portion, the amount of heat to be generated and the heating temperature can be lower than those in case of ejecting ink droplets by heat energy only, and response at a high speed recording is improved.

If actuation of the means for generating pressure change and actuation of the means for generating heat energy are well-timed, energy amount applied to one element can be decreased and thereby life of the element and the device can be prolonged.

If the conditions are appropriately set, the means for generating pressure change itself can work as a pump for transferring the ink to the heat acting portion and thereby a pump for feeding ink is not always necessary and the structure of the ink feeding portion can be simplified.

Figure 43:
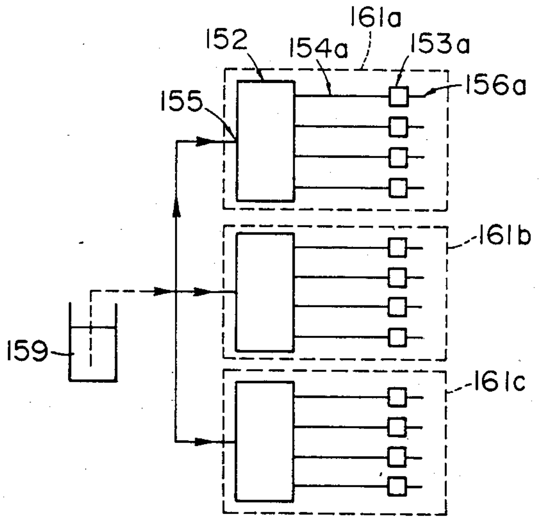
FIG. 43 is an explanatory view of an example in which a plurality of units shown in FIG. 41 are provided.

As illustrated in FIG. 43, if several pieces of the head shown in FIG. 41 are arranged in a unit, there can be easily and exactly obtained a multi-orifice array covering the whole span. The resulting device is excellent with respect to structure, high speed recording and maintenance.

In FIG. 43, each of 161*a*, 161*b* and 161*c* corresponds to a head unit in FIG. 41, and the other reference numerals stand for the same parts as reference numerals in FIG. 41.

In FIG. 43, a means for generating mechanical pressure change, a means for generating heat energy and a controlling portion are not shown in FIG. 43.

When so many elements are arranged, it is desirable to dive by matrix.

In the above mentioned device, shape and material of the liquid chamber, and type, shape and disposing position of the means for generating mechanical pressure change and the means for generating heat energy can be changed in various ways. For example, the electromechanical transducer may be used as a part of the liquid chamber wall facing the discharging orifice and a heat acting portion is disposed between a liquid chamber and a discharging orifice or the electromechanical transducer is disposed around a cylindrical liquid chamber (e.g. as a cylindrical piezoelectric vibrator) and a plurality of heat action portions are disposed in the liquid chamber.

Figure 44:
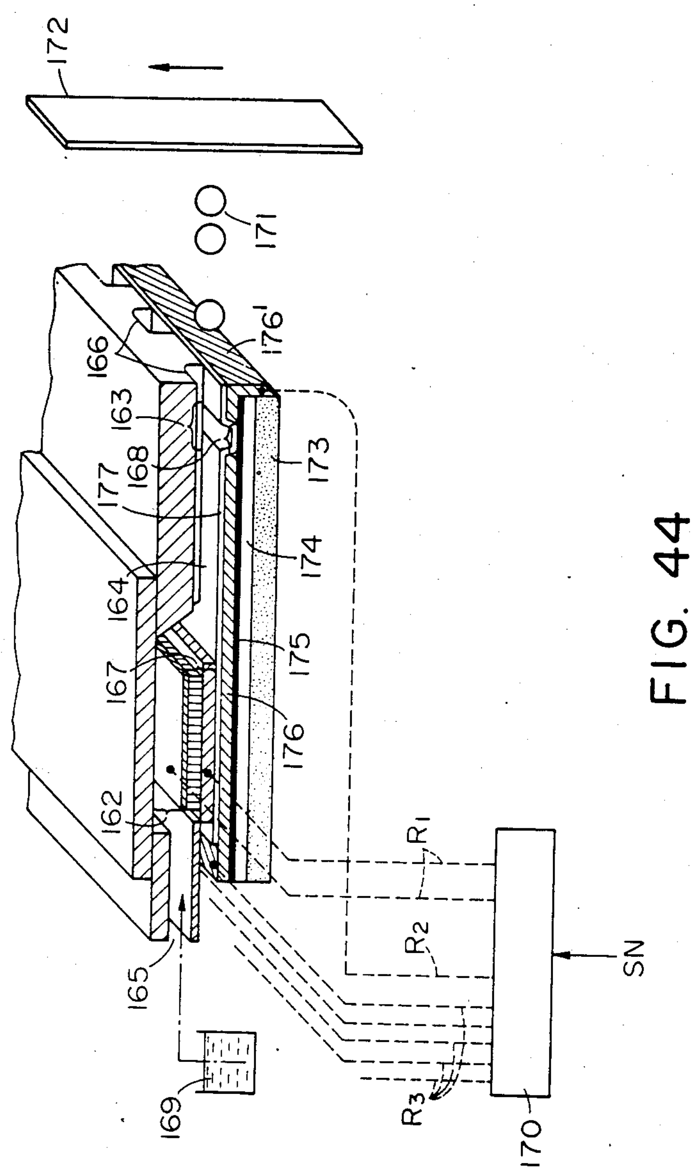
FIGS. 44, 45(*a*) and 45(*b*) are schematic views for showing still further embodiments of the present invention.

In FIG. 44, a cross sectional and oblique view of a discharging orifice is illustrated in connection with a structure where a piezoelectric element is disposed in a liquid chamber so as to change the volume of liquid chamber as a means for generating mechanical pressure change. A lid-like plate having many fine grooves is integrated with a base plate provided with a means for generating heat energy and the like. Ink is introduced into a liquid chamber 162 from an ink feeding portion 169 through an inlet 165. In the liquid chamber 162 is arranged a piezoelectric element 167 (not shown in the figure; it is usually of a structure composed of a piezoelectric element and a vibrating plate laminated with each other) actuated by a controlling portion 170. A conduit 164 is disposed between the liquid chamber and the heat acting portion.

In each heat acting portion 163 derived in plurality from the liquid chamber 162, there is disposed the electrothermal transducer 168 actuated selectively by the controlling portion 170.

The electrothermal transducer 168 is composed of a two-layered structure of a base plate consisting of a high heat conductive layer 173 (e.g. alumina and metals) and a low heat conductive layer 174 (e.g. oxides such as $SiO_2$ and the like, polyimide) for improving heat response, and a resistive layer 175, a selection electrode 174 etched in a predetermined form for flowing electricity and a common electrode 176' and the like (the selection electrode 176 and the electrothermal transducer 168 are arranged for each discharging orifice).

For example, a recording signal SN entering the controlling portion 170 is converted to a pulse signal and applied to a piezoelectric element 167 through a lead $R_1$ and thereby a pulse-like pressure change is generated in the ink.

On the other hand, a signal passing through $R_2$ and $R_3$ is applied to electrothermal transducer 168 at a predetermined position corresponding to the recording signal with a good timing set depending upon physical properties of the ink, volume of the liquid chamber and other parameters. Change of state of ink is caused in the heat acting portion 163 provided with a selected electrothermal transducer 168 and thereby a pressure change occurs.

As the result, when the pressure change caused by the piezoelectric element and the pressure change caused by the electrothermal transducer come together, an ink droplet 171 corresponding to the recording signal is ejected from the discharging orifice 166. The ink droplet attaches to the record receiving member 172 to form a recording image.

Figure 45A:
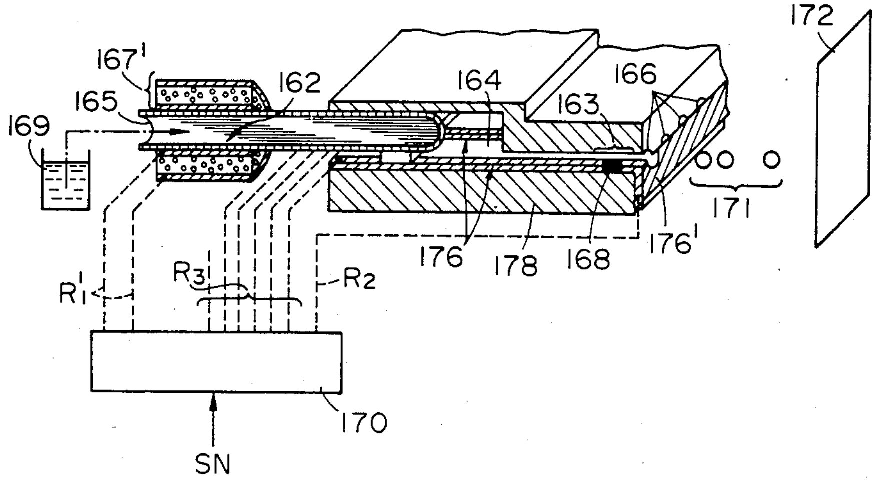
Figure 45B:
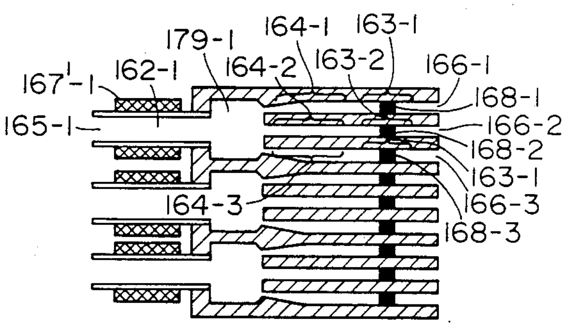

Further, in FIG. 45(*a*) there is illustrated an example of device where a cylindrical piezoelectric element is used as a means for generating mechanical pressure change. In this device, a cylindrical piezoelectric element 167' mounted around a cylindrical liquid chamber 162 and an electrothermal transducer 168 mounted on a base plate 178 are actuated in a synchronized manner to eject the ink from a discharging orifice 166.

Electrothermal transducer 168, common electrode 176', selection electrode 176, base plate 178 and the like are arranged in a way similar to those in FIG. 44, and the general manner is illustrated in FIG. 45(*a*). Cylindrical piezoelectric element 167' and electrothermal transducer 168 are actuated by signals applied through leads $R'_1$, and $R_2$ and $R_3$, respectively, from a controlling portion 170. However, these are synchronized in a way similar to those in FIG. 44 and the reference numerals are the same as those in FIG. 44.

In FIG. 45(*b*), there is illustrated a diagrammatical plan view of a multi-orifice type of head which is composed of a plurality of head unit as shown in FIG. 45(*a*). Around a liquid chamber 162-1 having an ink inlet 165, there is mounted a cylindrical piezoelectric element 167'-1, and in the liquid chamber 162-1 there are arranged a plurality of electrothermal transducers 168-1, 168-2 and 168-3 and a plurality of heat acting portions 163-1, 163-2, and 163-3. Further there are disposed common chamber 179-1 and conduits 164-1, 164-2 and 164-3 between liquid chamber 162-1 and heat acting portions 163-1, 163-2 and 163-3.

As mentioned above, the above examples have various modificated manner, and all of them serve to improve the recording characteristics.

What we claim is:

1. A device for recording comprising:

means defining a liquid chamber, said liquid chamber having a discharging orifice through which a liquid recording medium in said liquid chamber is ejected, the discharging orifice including a layer of a cured resin film which regulates the size of the opening of the discharging orifice.

2. A device according to claim 1, wherein the cured resin film is made of a resin liquid having the viscosity range of 100 cps–100,000 cps (25° C.).

3. A device according to claim 1, wherein the cured resin film is composed of any resin selected from polyurethane, silicone, phenolic and epoxy resins.

4. A device according to claim 1, wherein the discharging orifice has a size of 5 $\mu m\phi$–80 $\mu m\phi$.

5. A device according to claim 1, wherein the discharging orifice is composed of any material selected from quartz, glass, ceramics, metal, alloy and plastics.

6. A device according to claim 1, wherein the discharging orifice is a plurality of orifices.

7. A device according to claim 6, wherein all of the discharging orifices are provided with a substantially equal opening size.

8. A device according to claim 1, wherein the discharging orifice is in a circular form.

9. A device for recording comprising:

means defining a liquid chamber, said liquid chamber having a discharging orifice through which a liquid recording medium in said liquid chamber is ejected, the discharging orifice including a material insoluble in the liquid recording medium and produced in the form of a film by deposition which regulates the size of the opening of the discharging orifice, said deposition of said material being by means of one of sputtering, ion plating, vapor-phase growth and plasma polymerization, and said material being a polyxylylene resin or derivatives thereof.

10. A device for recording comprising:

means defining a liquid chamber, said liquid chamber having a discharging orifice through which a liquid recording medium in said liquid chamber is ejected, the discharging orifice including a material insoluble in the liquid recording medium and produced in the form of a film by deposition which regulates the size of the opening of the discharging orifice, said deposition of said material being by means of one of sputtering, ion plating, vapor-phase growth and plasma polymerization, and said material being a plasma polymerization product of a monomer of an organic compound.

11. A device for recording comprising:

means defining a liquid chamber, said liquid chamber having a discharging orifice through which a liquid recording medium in said liquid chamber is ejected, the discharging orifice including a material insoluble in the liquid recording medium and produced in the form of a film by deposition which regulates the size of the opening of the discharging orifice, said deposition of said material being by means of dispersing finely divided particles of said material in a non-liquid medium and solidifying said finely divided particles so that they adhere firmly to the discharging orifice.

12. The device according to claim 11, in which said deposition of said material is by means of sputtering.

13. The device according to claim 11, in which said deposition of said material is by means of vapor-deposition ion plating.

14. The device according to claim 11, in which said deposition of said material is by means of vapor-phase growth.

15. The device according to claim 11, in which said deposition of said material is by means of plasma polymerization.

16. A device for recording comprising:

means defining a liquid chamber, said liquid chamber having a discharging orifice through which a liquid recording medium in said liquid chamber is ejected, the discharging orifice including a material insoluble in the liquid recording medium and produced in the form of a film by deposition which regulates the size of the opening of the discharging orifice, said deposition of said material being by means of one of sputtering, vapor-deposition ion plating, vapor-phase growth and plasma polymerization.

17. A device according to claim 16, in which said deposition of said material is by means of sputtering.

18. A device according to claim 16, in which said deposition of said material is by means of vapor-phase growth.

19. A device according to claim 16, in which said deposition of said material is by means of plasma polymerization.

20. A device according to claim 16, wherein the material is a metal or metallic compound.

21. A device according to claim 16, wherein the discharging orifice is composed of any material selected from quartz, glass, ceramics, metal, alloy and plastics.

22. A device according to claim 16, wherein the discharging orifice is a plurality of orifices.

23. A device according to claim 22, wherein all of the discharging orifices are provided with a substantially equal opening size.

24. A device according to claim 16, wherein the discharging orifice is in a circular form.

25. A device according to claim 16, wherein the discharging orifice has a size of 5 $\mu m\phi$–20 $\mu m\phi$.

* * * * *

UNITED STATES PATENT AND TRADEMARK OFFICE
CERTIFICATE OF CORRECTION

PATENT NO. : 4,707,705

DATED : November 17, 1987

INVENTOR(S) : TOSHITAMI HARA, ET AL.

It is certified that error appears in the above-identified patent and that said Letters Patent is hereby corrected as shown below:

COLUMN 1

Line 24, "unconfortable" should read --uncomfortable--.

COLUMN 4

Line 36, "are" should be deleted.
Line 37, "overlapped" should read --overlap--.

COLUMN 5

Line 28, "easiness" should read --ease--.
Line 53, "more exhibited" should read --exhibited more--.

COLUMN 6

Line 30, "correspondingly" should read --corresponding--.
Line 39, "in the" should read --to a--.
Line 45, "more exhibited" should read --exhibited more--.

COLUMN 7

Line 7, "it" should read --is--.
Line 58, "$Zrl_2$" should read --$ZrB_2$--.
Line 68, "out" should be deleted.

COLUMN 8

Line 8, "the area" should read --area--.
Line 33, "is" should read --are--.
Line 48, "embeded" should read --embedded--.

UNITED STATES PATENT AND TRADEMARK OFFICE
CERTIFICATE OF CORRECTION

PATENT NO. : 4,707,705
DATED : November 17, 1987
INVENTOR(S) : TOSHITAMI HARA, ET AL.

It is certified that error appears in the above-identified patent and that said Letters Patent is hereby corrected as shown below:

COLUMN 9

Line 68, "the" should be deleted.

COLUMN 10

Line 3, "materail" should read --material--.

COLUMN 12

Line 55, "$\Delta$a" should read --$\Delta$n--.

COLUMN 14

Line 10, "plain plate 85" should read --plane plate 85--.
Line 40, "method." should read --methods.--.
Line 62, "step. Appropriate" should read --step, appropriate--.

COLUMN 15

Line 1, "constitutes" should read --constitute--.
Line 4, "is" should read --are--.
Line 18, "together mixed." should read --mixed together.--.

COLUMN 16

Line 67, "the this" should read --this--.

UNITED STATES PATENT AND TRADEMARK OFFICE

CERTIFICATE OF CORRECTION

PATENT NO. : 4,707,705
DATED : November 17, 1987
INVENTOR(S) : TOSHITAMI HARA, ET AL.

It is certified that error appears in the above-identified patent and that said Letters Patent is hereby corrected as shown below:

COLUMN 18

Line 18, "Polyxylene" should read --Polyxylylene resin--.
Line 33, "dishcharge" should read --discharge--.
Line 56, "easiness" should read --ease--.
Line 58, "contrinu-" should read --continu- --.

COLUMN 20

Line 27, "loiwng" should read --lowing--.

COLUMN 21

Line 7, "(7) tetragycidyl" should read --(7) tetraglycidyl--.

COLUMN 25

Line 46, "monoethyl amine" should read --monoethanol amine--.

COLUMN 26

Line 18, "p,p'-diaminophenyl methane" should read --p,p'-diaminodiphenyl methane--.

COLUMN 28

Line 60, "2-glycidylphenyl glycidyl ether" should read --2-glycidylphenyl glycidyl ether (9)--.

UNITED STATES PATENT AND TRADEMARK OFFICE

CERTIFICATE OF CORRECTION

PATENT NO. : 4,707,705

DATED : November 17, 1987

INVENTOR(S) : TOSHITAMI HARA, ET AL.

It is certified that error appears in the above-identified patent and that said Letters Patent is hereby corrected as shown below:

COLUMN 29

Line 60, "orthophtalate:" should read --orthophthalate:--.

COLUMN 30

Line 58, "to form" should read --formation of--.

COLUMN 31

Line 31, "that" should read --in which--.
Line 36, "formation of" should read --form--.
Line 46, "diagrammatial" should read --diagrammatic--.
Line 47, "in in" should read --in--.

COLUMN 32

Line 3, "to" should read --of--.
Line 13, "are" should read --is--.
Line 23, "improving" should read --improvement--.

COLUMN 34

Line 40, "elment" should read --element--.

COLUMN 35

Line 8, "het" should read --heat--.
Line 61, "rapid" should read --quicker--.
Line 61, "rnage." should read --change--.

UNITED STATES PATENT AND TRADEMARK OFFICE

CERTIFICATE OF CORRECTION

PATENT NO. : 4,707,705

DATED : November 17, 1987

INVENTOR(S) : TOSHITAMI HARA, ET AL.

It is certified that error appears in the above-identified patent and that said Letters Patent is hereby corrected as shown below:

COLUMN 37

Line 19, "portion" should read --portions--.

COLUMN 38

Line 18, "that" should read --in which--.
Line 42, "since" should read --sine--.

COLUMN 39

Line 39, "dive" should read --drive--.

COLUMN 40

Line 11, "174" should read --176--.
Line 67, "modificated manner," should read --modifications,--.

UNITED STATES PATENT AND TRADEMARK OFFICE
CERTIFICATE OF CORRECTION

PATENT NO. : 4,707,705

DATED : November 17, 1987

INVENTOR(S) : TOSHITAMI HARA, ET AL.

It is certified that error appears in the above-identified patent and that said Letters Patent is hereby corrected as shown below:

COLUMN 42

Line 54, "5 $\mu m^{\phi}$ - 20 $\mu m^{\phi}$
--5μφ-200μφ--.

Signed and Sealed this

Sixteenth Day of August, 1988

*Attest:*

DONALD J. QUIGG

*Attesting Officer*

*Commissioner of Patents and Trademarks*